United States Patent
Ohmura

(10) Patent No.: US 8,243,168 B2
(45) Date of Patent: Aug. 14, 2012

(54) IMAGE MANAGER AND DIGITAL CAMERA

(75) Inventor: Akira Ohmura, Shibuya-ku (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 11/979,518

(22) Filed: Nov. 5, 2007

(65) Prior Publication Data

US 2008/0180532 A1    Jul. 31, 2008

Related U.S. Application Data

(62) Division of application No. 10/436,097, filed on May 13, 2003, now abandoned.

(30) Foreign Application Priority Data

| May 14, 2002 | (JP) | 2002-137929 |
| May 14, 2002 | (JP) | 2002-137930 |
| May 14, 2002 | (JP) | 2002-137931 |
| May 14, 2002 | (JP) | 2002-137932 |
| May 14, 2002 | (JP) | 2002-137933 |
| May 14, 2002 | (JP) | 2002-137934 |
| May 14, 2002 | (JP) | 2002-137935 |
| May 14, 2002 | (JP) | 2002-137936 |
| May 14, 2002 | (JP) | 2002-137937 |
| May 15, 2002 | (JP) | 2002-139386 |
| May 15, 2002 | (JP) | 2002-139387 |
| May 15, 2002 | (JP) | 2002-139388 |

(51) Int. Cl.
*H04N 5/907* (2006.01)

(52) U.S. Cl. .................. 348/231.6; 348/231.5

(58) Field of Classification Search ............... 348/207.1, 348/211.2, 231.99, 231.3, 231.5, 231.6
See application file for complete search history.

(56) References Cited

U.S. PATENT DOCUMENTS

| 5,805,215 | A | * | 9/1998 | Mizoguchi ................. 348/231.5 |
| 6,321,231 | B1 | | 11/2001 | Jebens et al. |
| 6,558,320 | B1 | * | 5/2003 | Causey et al. ................. 600/300 |
| 6,564,225 | B1 | | 5/2003 | Brogliatti et al. |
| 6,628,899 | B1 | | 9/2003 | Kito |
| 6,690,883 | B2 | * | 2/2004 | Pelletier ..................... 348/231.3 |
| 6,763,178 | B1 | * | 7/2004 | Suzuki et al. ................... 386/95 |
| 7,225,203 | B2 | | 5/2007 | Kohno |

(Continued)

FOREIGN PATENT DOCUMENTS

JP    A 11-98404    4/1999

(Continued)

OTHER PUBLICATIONS

Technical Standardization Committee on AV & IT Storage Systems and Equipment of the Japan Electronics and Information Technology Industries Association, "Exchangeable image file format for digital still cameras: Exif Version 2.2," Apr. 2002, pp. 2, 11, and 64-67.*

(Continued)

*Primary Examiner* — Jason Whipkey

(74) *Attorney, Agent, or Firm* — Oliff & Berridge, PLC

(57) ABSTRACT

An image manager includes a communicator that communicates with a server computer storing image data, a detector that detects a storage capacity of image data stored into the server computer by the communicator and a controller that controls download of image data stored into the server computer in response to a detection result of the detector.

8 Claims, 30 Drawing Sheets

U.S. PATENT DOCUMENTS

| | | | |
|---|---|---|---|
| 2002/0021359 A1 | 2/2002 | Okamoto | |
| 2002/0057851 A1 | 5/2002 | Ohdate et al. | |
| 2002/0067308 A1* | 6/2002 | Robertson | 342/357.17 |
| 2002/0078038 A1 | 6/2002 | Kotani | |
| 2002/0087601 A1* | 7/2002 | Anderson et al. | 707/515 |
| 2002/0120634 A1* | 8/2002 | Min et al. | 707/200 |
| 2003/0043282 A1* | 3/2003 | Malloy Desormeaux | 348/231.3 |
| 2003/0050982 A1* | 3/2003 | Chang | 709/206 |
| 2003/0169814 A1* | 9/2003 | Fu et al. | 382/232 |
| 2003/0174213 A1 | 9/2003 | Matsumoto et al. | |
| 2004/0201740 A1* | 10/2004 | Nakamura et al. | 348/231.3 |
| 2005/0151857 A1* | 7/2005 | Noguchi et al. | 348/231.7 |
| 2008/0119207 A1* | 5/2008 | Harris | 455/456.3 |

FOREIGN PATENT DOCUMENTS

| | | |
|---|---|---|
| JP | A 11-175533 | 7/1999 |
| JP | A 11/220691 | 8/1999 |
| JP | A 11-341406 | 12/1999 |
| JP | A 11/341407 | 12/1999 |
| JP | A 2000-172641 | 6/2000 |
| JP | A 2000-293975 | 10/2000 |
| JP | A 2001-297090 | 10/2001 |
| JP | A 2002-94858 | 3/2002 |
| JP | A 2002-117127 | 4/2002 |

OTHER PUBLICATIONS

Notice of Reasons for Refusal issued in Japanese Patent Application No. 2007-321897; mailed Apr. 6, 2010; with English-language translation.

Notice of Reasons for Refusal issued in Japanese Patent Application No. 2007-279749; mailed Apr. 6, 2010; with English-language translation.

* cited by examiner

IMAGE MANAGER AND DIGITAL CAMERA

This is a Divisional of U.S. patent application Ser. No. 10/436,097 filed on May 13, 2003, which is hereby incorporated by reference in its entirety.

INCORPORATION BY REFERENCE

This application is based upon and claims priority of Japanese Patent Applications No. 2002-137929 filed on May 14, 2002, No. 2002-137930 filed on May 14, 2002, No. 2002-137931 filed on May 17, No. 2002-137932 filed on May 14, No. 2002-137933 filed on May 14, No. 2002-137934 filed on May 14, No. 2002-137935 filed on May 14, No. 2002-137936 filed on May 14, No. 2002-137937 filed on May 14, No. 2002-139386 filed on May 15, No. 2002-139387 filed on May 15, and No. 2002-139388 filed on May 15 the contents being incorporated herein by reference.

BACKGROUND OF THE INVENTION

1. Field of the Invention

The present invention relates to an image manager controlling a plurality of image data and a digital camera.

2. Description of Related Art

In this field of the art, there is an image manger that controls image data storing information about a shooting environment, a keyword and the like with linkage to image data. And an image manager of a prior art can search for and extract image data from information about a shooting environment, a keyword and so.

But, with an image manager of a prior art, it becomes difficult to search for specific image data from a lot of stored image data as image data get stored in large quantity. Also, in order to locate easily, a careful and minute registration of a keyword and the like has been required when storing image data into an image manager.

SUMMARY OF THE INVENTION

In order to overcome the problems and disadvantages, the invention provides an image manager including a communicator that communicates with a server computer storing image data and a detector that detects a storage capacity of image data stored into the server computer by the communicator. The image manager further includes a controller that controls download of image data stored into the server computer in response to a detection result of the detector.

According to another feature of this invention, an image manager includes a memory that stores image data recorded onto a connected storage medium and a management controller that performs a first management control storing image data into the memory and registering information about image data as management data and a second management control not storing image data into the memory but registering information about image data as management data.

According to still another feature of the invention, an image manager includes a connector that connects to a digital camera capable of creating contracted image data from photographed image data, storing the contracted image data and sending the image data to an outside storage device and a register that registers information about the image data into management data based upon the contracted image data when connecting to the digital camera via the connector.

According to a further feature of the invention, an image manager includes a register that registers information about image data as management data and an obtaining device that obtains information to register into management data for controlling image data. The image manager further includes an attachment device that attaches obtained information obtained by the obtaining device to image data.

According to still further feature of the invention, an image manager includes a register that registers information about image data as management data and an obtaining device that obtains information to register into management data for controlling image data based upon schedule data.

Other feature and advantages according to the invention will be readily understood from the detailed description of the preferred embodiments in conjunction with the accompanying drawings.

DETAILED DESCRIPTION OF THE PREFERRED EMBODIMENTS

Figure 1:
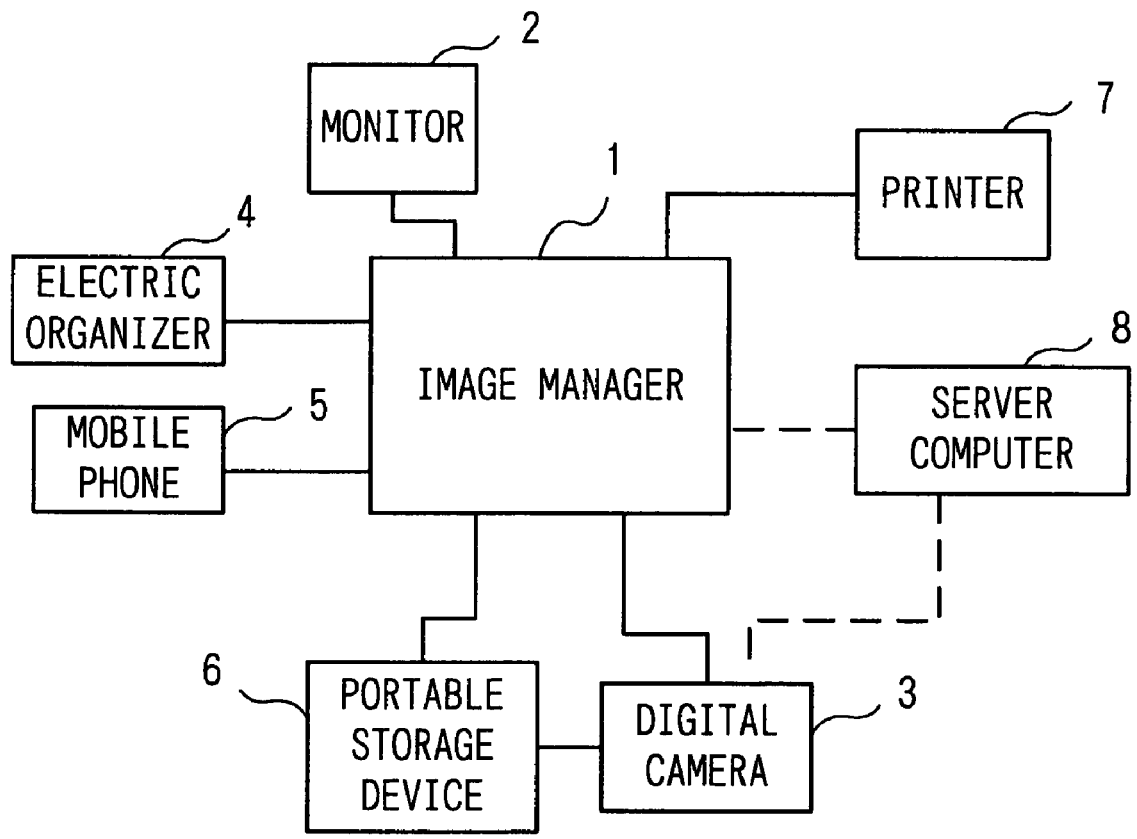
FIG. 1 shows image manager 1 of an embodiment in accordance with this invention and various units connected to image control device 1.

An image manager of an embodiment of this invention will be explained as below. FIG. 1 shows image manager 1 of an embodiment in accordance with this invention and various devices connected to image manager 1.

Monitor 2, digital camera 3, electronic hand-held organizer 4, mobile phone 5, portable storage unit 6, printer 7, server computer 8 and the like are communicably connected to image manager 1.

Image manager 1 is a device that controls image data created by digital camera and the like. Monitor 2 is a device that displays an image based upon an imaging signal output by image manager 1. Digital camera 3 is a camera that creates digital image data. Electronic hand-held organizer 4 is a portable remote terminal that has scheduling management software. Mobile phone 5 is a telephone that has a phone, e-mail and scheduling management functions and so on. Portable storage unit 6 is a portable storage device that has a built-in hard disk with a certain level of memory capacity. Portable storage unit 6 goes with a remote terminal such as a digital camera and the like when going outside and is a device that stores data created by a remote terminal.

Printer 7 is a device that makes a print based upon an output signal of image manager 1. Server computer 8 is a computer that communicably connects to image manager 1 via a network like the Internet and carries out data communications such as image data or so. Also, server computer 8 carries out communications with digital camera 2 via a network like the Internet, receives and stores image data created by digital camera 2.

Figure 2:
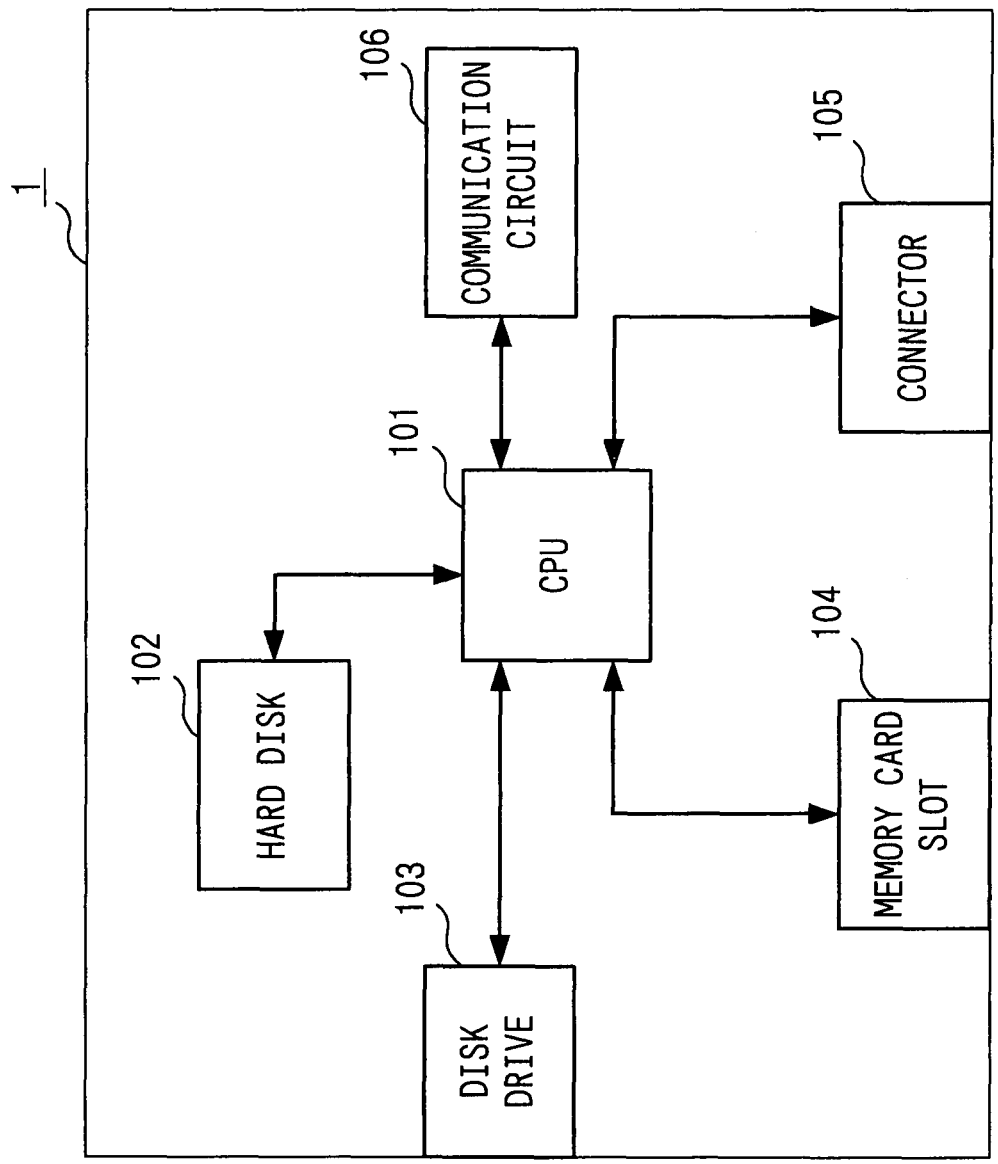
FIG. 2 is a function block diagram showing a function of image manager 1 of an embodiment in accordance with this invention.

FIG. 2 is a function block diagram showing a function of image manager 1 of an embodiment in accordance with this invention. Image manager 1 is provided with CPU 101, hard disk 102, disk drive 103, memory card slot 104, connector terminal 105 and communication circuit 106. CPU 101 executes various functions to be carried out in image manager 1. Hard disk 102 is a bulk memory that stores image data. Also, various programs to be carried out in image manager 1 are recorded onto hard disk 102.

Disk drive 103 is a drive that reproduces image data or so recorded onto an attached CD, CD-R, CD-RW and the like. Also, disk drive 103 not only reproduces image data but also can write image data or so onto CD-R, CD-RW and the like. Also, besides CD, CD-R and CD-RW, disk drive 103 can realize write of image data or so onto a disk having a DVD format as well. Memory card slot 104 is a slot that records and reproduces image data or so recorded to an attached memory card. In a memory card, there are a writable memory and a write-once memory that is not writable.

Connector terminal 105 is a connector that communicably connects to another device such as a digital camera, an electric hand-held organizer and the like over wired or wireless communication. Communication circuit 106 is a circuit that communicates with a server computer or so via the Internet.

Image manager 1 of this embodiment in accordance with this invention may be an image management-dedicated device with a pre-installed image management program or a device corresponding to a personal computer into which a user will install an image management program later on. For instance, an image management program is provided by downloading from CD-ROM or via the Internet.

Next, a management way of image data in image manager 1 of the embodiment in accordance with this invention will be explained.

Figure 3:
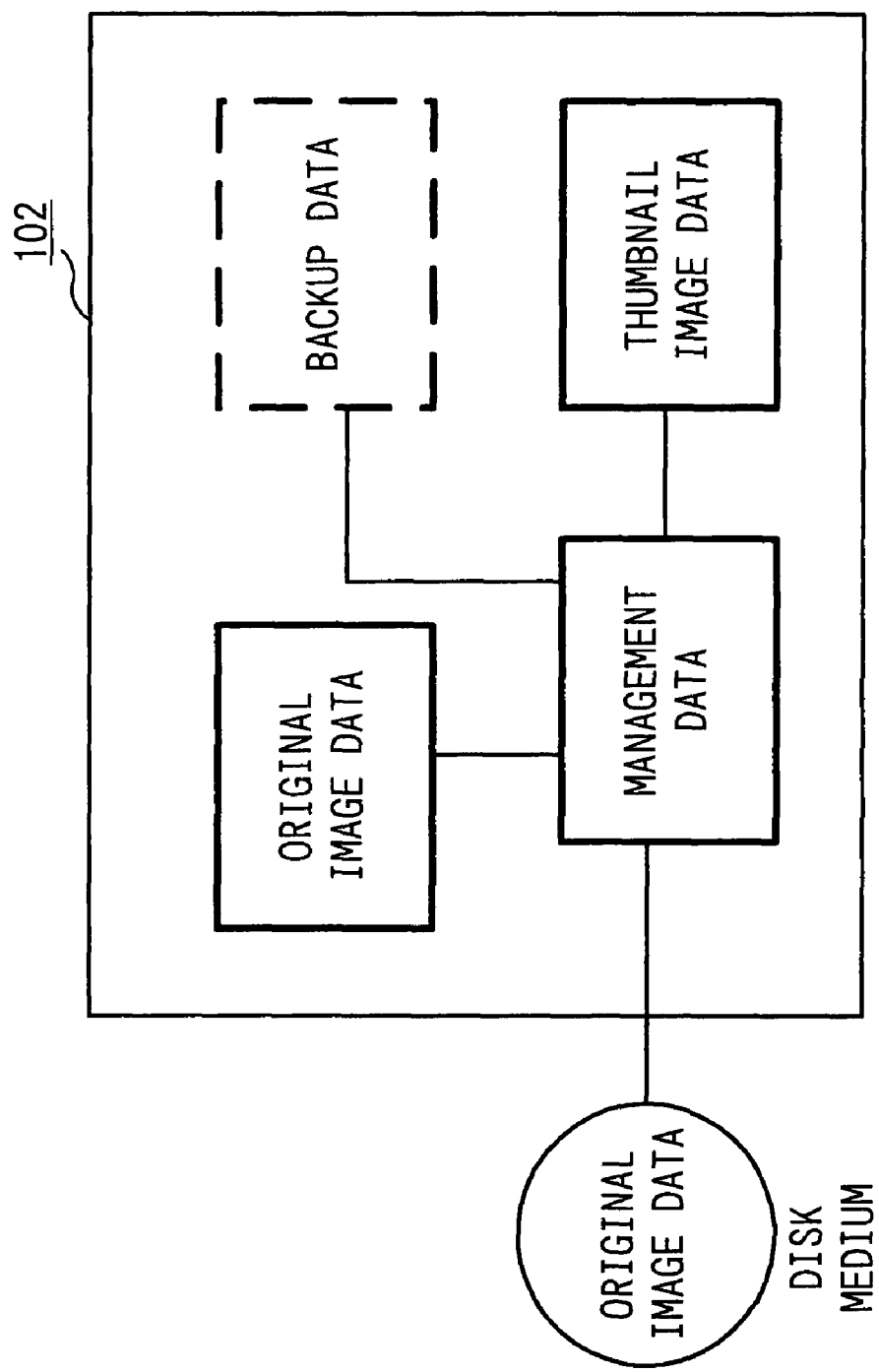
FIG. 3 is a diagram explaining conceptually how to control image data in image manager 1.

FIG. 3 is a diagram explaining conceptually how to manage image data in image manager 1.

An image management consists of original image data, management data and thumbnail image data. Original image data is image data that is created by a digital camera and the like. Management data and thumbnail image data are created by registration works image manager 1 performs.

Thumbnail image is image data for management purposes to collectively reproduce image data in image manager 1. Also, thumbnail image data is composed in an Exif (Exchange Image File) file and has same shooting information as original image data at an Exif tag of a file header portion.

Management data registers information such as information obtained from image data, entered information, information caused by operations and the like each image data. Also, management data registers information about a storage location of original image data.

These data are stored into hard disk 102. Original data may be stored into a medium like CD-R or so, not hard disk 102.

Various controls to be carried out by image manager 1 of the embodiment of this invention will be explained.

Firstly, a management control of image data to be carried out by image manager 1 will be explained.

A different management control is carried out depending upon a device or disk drive 103 that will be put into a connector terminal of image manager 1 and a memory that will be put into memory card slot 104.

An image management control carried out by image manager 1 judges a type of a disk put into disk drive 103 and performs differently. A judgment of a disk type includes not only a kind of a medium such as CD, CD-R, CD-RW, DVD and the like, but also contents of a disk such as commercially available photo collection CD, CD-R produced by a photo lab, CD-R created by a user or so. These judgments are made from a kind of data, a disk volume label, a serial number and so recorded onto a disk.

Now, a case of CD-R produced by a photo lab will be explained. A photo lab dealing with a development of a sliver halide film and a photo print provides a service that digitalizes image data of a film and records digitalized image data onto a memory medium such like CD or so. CD-R produced by a photo lab is a disk that is produced by a photo lab through the foregoing service. With this service, even a user of a silver halide film camera can handle easily photographed image data via a PC and the like.

An image management control carried out by image manager 1, for instance, in a case where an attached disk is CD-R, detects a volume label or serial number and the like allocated to CD-R and image data and judges whether the attached CD-R has been already registered. When there is overwritten image data after preceding registration, it has the same serial number and then, a judgment based upon a serial number only might result that the attached CD-R has been already registered. Also, a disk with the same serial number might exist. In a case where a detected disk has not been registered, it is detected whether a volume label created according to a specific rule by a photo lab is attached. It is judged whether the disk in question is CD-R produced by a photo lab judging from a volume label. Also, a photo lab producing the disk is specified from a volume label. Once a photo lab is specified, as image manager 1 stores trend information about image data each photo lab in advance, a corrective processing appropriate to a specified photo lab can be performed when reproducing image data or making a photo print or the like.

Some CD-R produced by a photo lab records dedicated browsing software to view image data. When this image management control software is running, an automatic startup of dedicated browsing software recorded onto CD-R is inhibited. Also, if dedicated browsing software is not set up yet, a setup work for dedicated browsing software so as to start up when CD-R is loaded is prohibited. In other words, when this control software is in action, an automatic running function at a time of a disk attachment is halted.

Figure 4:
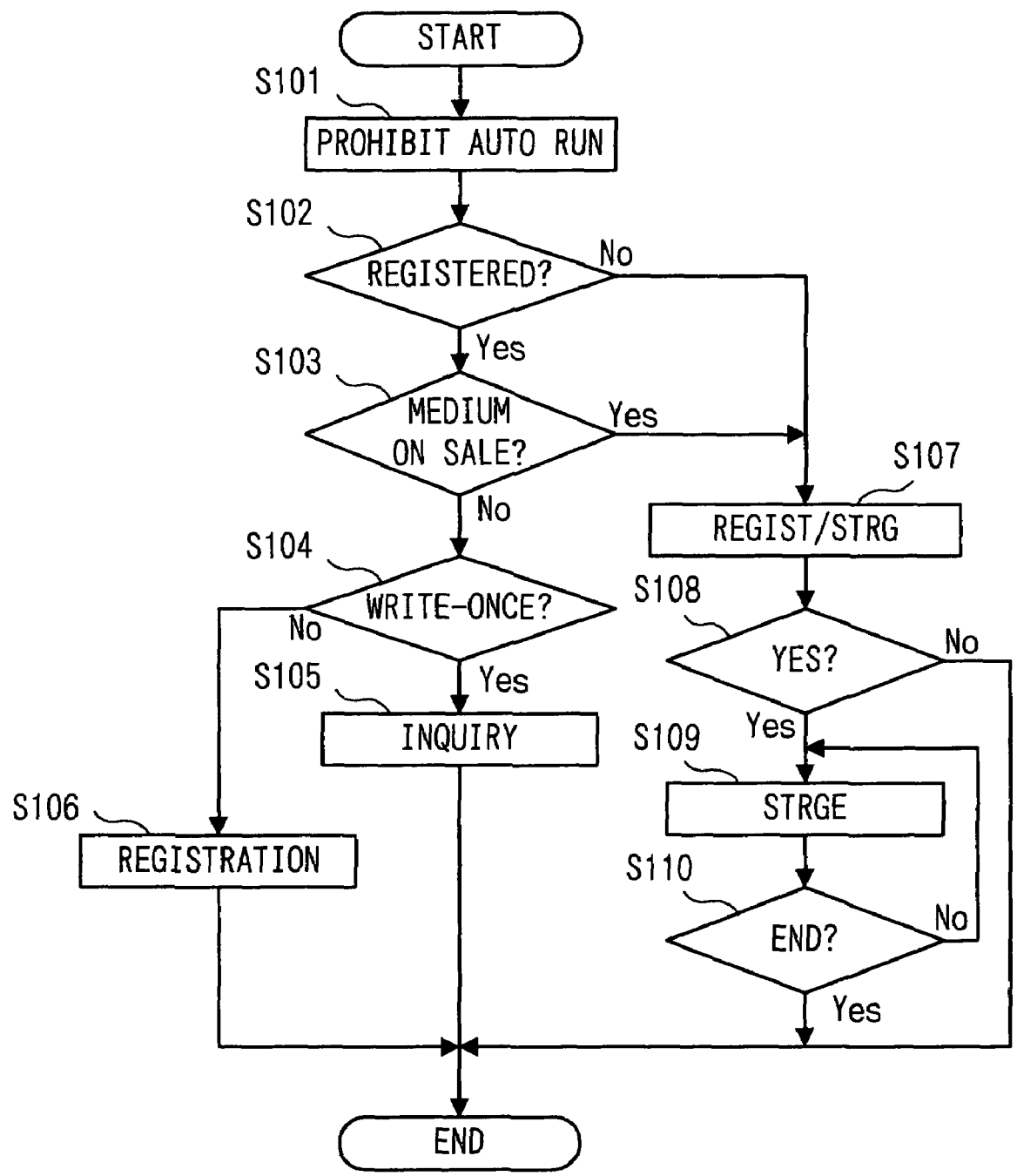
FIG. 4 is a flow chart illustrating an image management control performed by image manager 1.

An image management control carried out by image manager 1 will be specifically explained as below. FIG. 4 is a flow chart illustrating an image management control carried out by image manager 1. This flow starts detecting attachment of a disk storing image data into disk drive 103.

Firstly, in step S101, an automatic running function for automatically starting up a given program in response to attachment of a disk is halted. Thus, when an image management control is at work, as an unnecessary program is not automatically started up, a user does not feel annoying.

Next, in step S102, it is checked whether all image data within an attached disk have been already registered into image management data in hard disk 102. In this step, firstly, a serial number and volume number are checked and then it is checked whether an attached disk is already registered into management data. When it is already registered, it is checked whether image data stored into a disk is registered into management data. For example, when an attached disk is CD-R, CD-RW and the like, as image data is writable on it later on, image data with no registration might exist although a serial and volume numbers of a disk have been already registered. These processing are performed and when all image data stored into a disk have been already registered, a flow proceeds to step S107. When non-registered image data exists, a flow proceeds to step S103.

In step S103, it is checked whether an attached disk is a disk such as a commercially available photo collection CD and so on. When it is a commercially available photo collection CD, a flow proceeds to step S107 as a registration of image data into management data is not required. When it is not a commercially available photo collection CD, a flow proceeds to step S104.

In step S107, a monitor displays that an attached CD is already registered and a commercially available photo CD. And a user is asked whether image data is stored into a hard disk.

The inquiry's reason here is that there is a possibility that a user might want to store image data recorded onto a disk into hard disk 103 in addition to a registration of management data as a registered disk is attached again into disk drive 103. The same reason goes for a commercially available photo CD and a user is asked whether image data is stored into a hard disk.

In step S108, in response to an inquiry, it is checked whether there is an instruction to store image data into a hard disk and when there is an instruction, a flow proceeds to step S109 and when there is an instruction to not store, a flow ends.

In step S109, image data in a disk are stored into a given area in a hard disk. And in step S110, it is checked whether a storage work is finished and when it is finished, a flow ends and when it is not over yet, a flow gets back to step S109 and a storage work is continued.

In step S104, it is checked whether a disk attached into disk drive 103 is a write-once medium such as CD-R and the like and when a disk is CD-R, a flow proceeds to step S105 and when it is not CD-R, a flow proceeds to step S106. In step S105, a registration control for a write-once medium is performed. A registration control for a write-once medium will be explained by referring to FIGS. 5~7.

In step S106, a registration control for a normal medium, not a write-once one, is performed. A normal medium as referred to hereinafter means a rewritable medium such as CD-RW and the like capable of rewriting recorded image data. A registration control for a normal medium will be explained by referring to FIG. 6.

Next, a registration control carried out by image manager 1 will be explained.

Firstly, an example of a registration control in a write-once medium carried out in step S105 of FIG. 4 will be explained.

Figure 5:
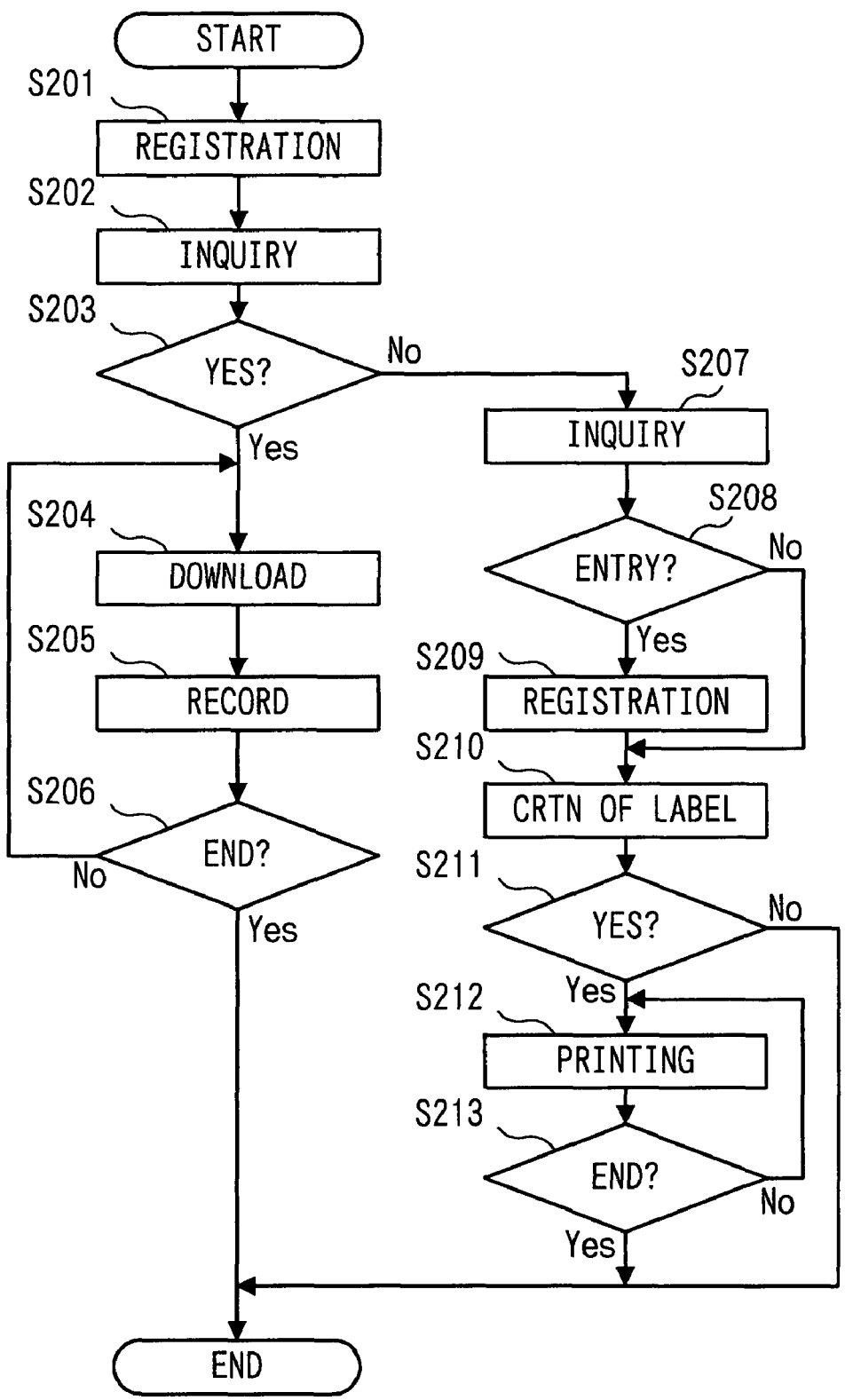
FIG. 5 is a flow chart illustrating a registration control against image data stored in a write-once medium.

FIG. 5 is a flow chart illustrating a registration control against image data recorded in a write-once medium.

In step S201, a registration work of management data is performed. A registration work to be performed here is to create a thumbnail image of original image data and register shooting information attached to original image data at a time of shooting and a thumbnail image into management data. Management data is stored into hard disk 102. Shooting information, when original image data is created in an Exif format, is registered to a header portion of a file as an Exif tag. Further details of a registration work will be available later.

In step S202, a user is asked whether original data recorded in a disk is stored into hard disk 102. The reason why an inquiry is made is as follow. For example, as original image data recorded into a write-once medium such as CD-R and the like cannot be overwritten with new image data, it cannot be erased. Thus, when CD-R is a user's property, just attaching CD-R into disk drive 103 works even if image data isn't stored into a hard disk. And as original image data is stored in management data, even when CD-R isn't attached, a search and extraction of image data recorded in CD-R are possible.

In step S203, it is checked whether there is an instruction to store into hard disk 102 and when there is, a flow proceeds to step S204 and when not, a flow proceeds to step S207.

In step S204, downloading original image data in CD-R is performed. And in step S205, downloaded original image data is stored into hard disk 102. In step S206, it is checked whether download and storage works are finished and when they are finished, a flow ends. When they are not finished, a flow gets back to step S204. On the other hand, in step S207, an entry form for causing a user enter where to save an attached CD-R is displayed on a monitor. Not only a storage location but also another information such as an owner and so can be entered into an entry form. In step S208, it is checked whether necessary information such as a storage location, an owner and so have been entered and when they have been, a flow proceeds to step S209 and when they haven't, a flow proceeds to step S210.

In step S209, entered information about a storage location and an owner is written and registered into management data. In step S210, a user is asked whether a label to be glued on CD-R or a CD sleeve is created and printed. The reason why a label and/or a sleeve are created in this stage is as follow. As original image data has not been stored into hard disk 102, when image data in CD-R is searched for and extracted based upon registered management data, image manger 1 instructs to attach the CD-R recording searched and extracted image data. Then, when a user is required to look for and attach the CD-R into disk drive 103 and at a time of searching, a label and/or CD sleeve become helpful. A label and CD sleeve have information such as a serial number, a title and so printed.

In step S211, it is judged whether a label creation is instructed and when a creation is instructed, a flow proceeds to step S212 and when a creation isn't instructed, a flow ends. In step S212, a label creation processing is executed. In step S213, it is checked whether a label creation processing is finished and when it is finished, a flow ends and when it isn't, a flow gets back to step S212.

Next, another example of a registration control against a write-once medium carried out in step S105 of FIG. 4 will be explained. This example does not download original image data recorded onto a disk attached into disk drive 103.

Figure 6:
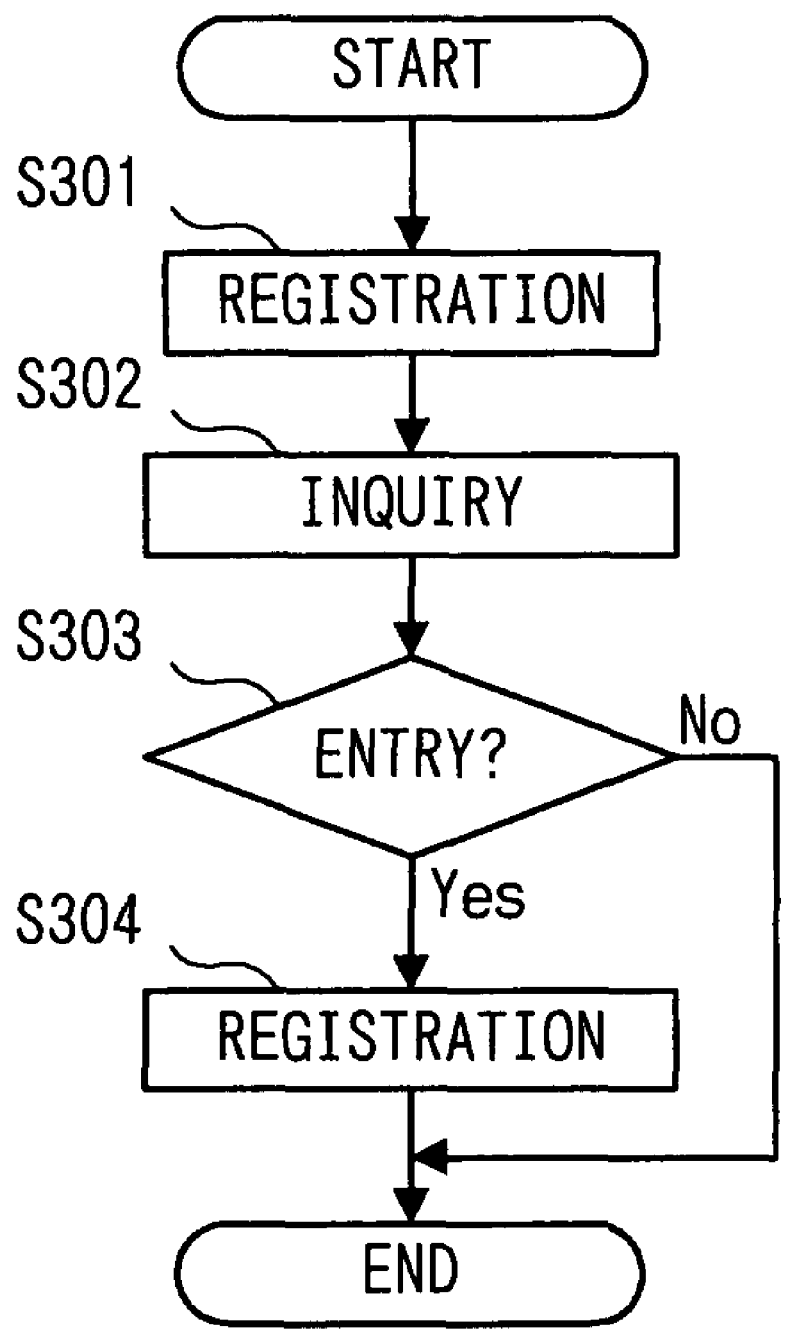
FIG. 6 is a flow chart illustrating a registration control against image data stored in a write-once medium.

FIG. 6 is a flow chart illustrating a registration control against image data recorded onto a write-once medium.

Firstly, in step S301, a registration work of management data is performed. In step S302, an entry form to enter a storage location and an owner of a write-once medium CD-R is displayed on a monitor. In step S303, it is checked whether information such as a storage location, an owner and so is entered into by a user and when it is entered, a flow proceeds to step S304 and when it isn't, a flow ends. In step S304, entered information is additionally registered into management data.

Accordingly, when an attached disk is a write-once medium, only a registration work is performed and as original image data isn't stored into hard disk 102, a memory capacity of hard disk 102 does not get decreased.

Further, another example of a registration control against a write-once medium carried out in step S105 of FIG. 4 will be explained. This example automatically downloads original image data to save as a backup copy of image data even when a disk attached to disk drive 103 is a write-once medium such as CD-R and so and stores image data into hard disk 102.

Figure 7:
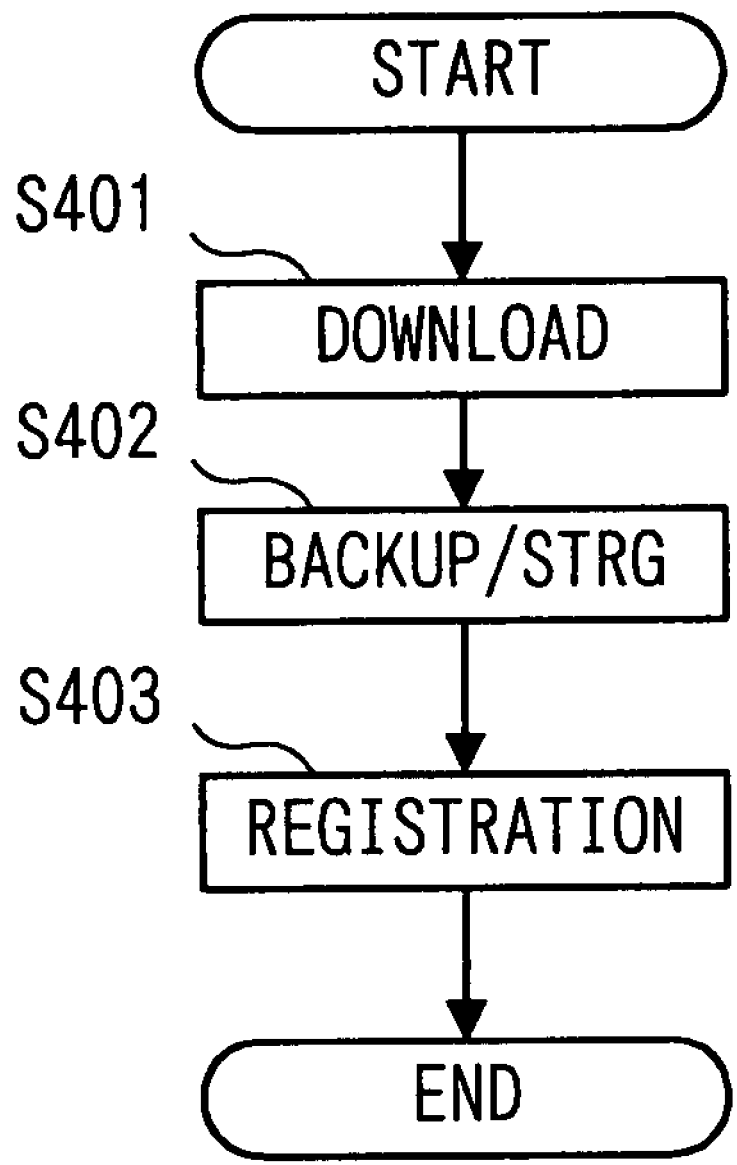
FIG. 7 is a flow chart illustrating a registration control against image data stored in a write-once medium.

FIG. 7 is a flow chart illustrating a registration control against image data recorded onto a write-once medium. In step S401, download of image data in a write-once medium is executed. In step S402, downloaded image data is saved into a backup area in hard disk 102 as a backup copy of image data. Then, in step S403, a registration work of management data is executed.

Figure 8:
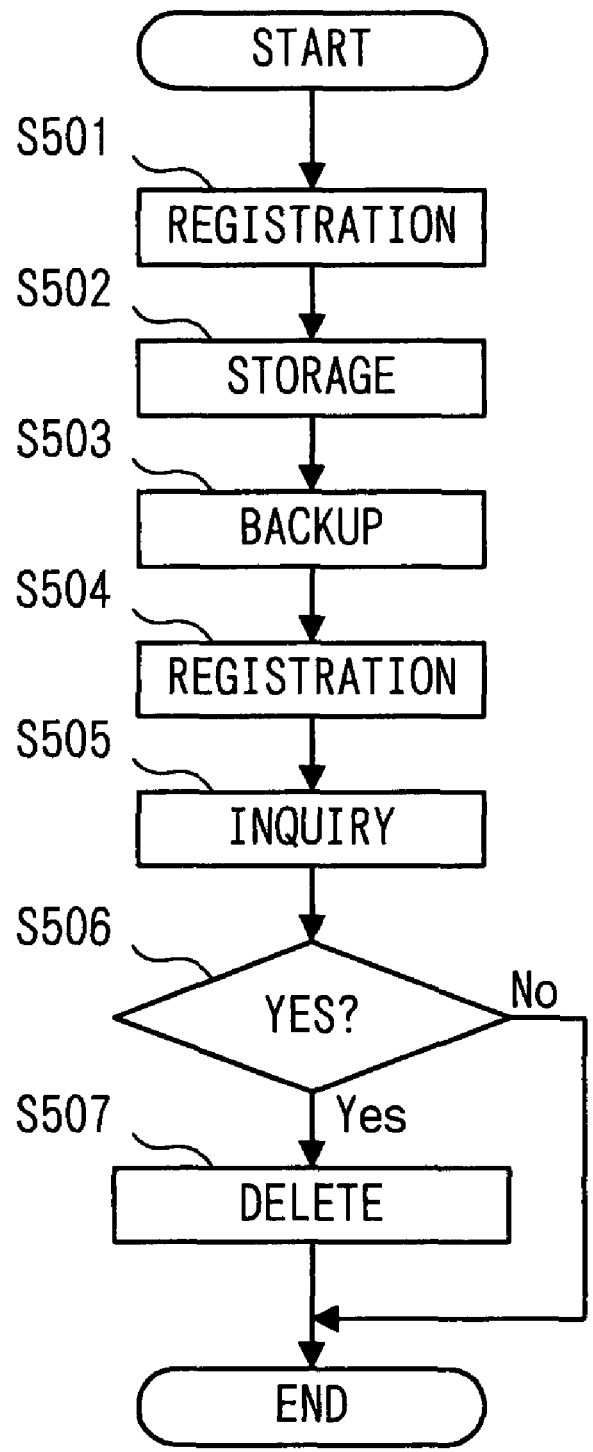
FIG. 8 is a flow chart illustrating a registration control performed by image manager 1.

Next, a registration work in a normal medium rather than a write-once medium carried out in step S106 of FIG. 4 will be explained. FIG. 8 is a flow chart illustrating a registration control to be performed by image manager 1.

In step S501, image data in a disk is downloaded. In step S502, image data downloaded for an image database registration is saved into a given area in hard disk 102. Further, in step S503, image data downloaded to a backup area of hard disk 102 is saved as a backup copy of image data.

In step S504, a thumbnail image is created and management information is created from information attached to image data, and they are registered as management data. In step S505, a user is asked whether image data in a disk is deleted. In step S506, it is checked whether a deletion is instructed and when a deletion is instructed, a flow proceeds to step S507 and when it is not instructed, a flow ends. And in step S507, image data in a disk is deleted.

Accordingly, in accordance with a control described in FIGS. 7~8, image manager 1 creates a backup copy original image data. Therefore, even in the event of something wrong with original image data, a user can feel safe with a backup copy of image data. And, as explained in FIG. 7, when an attached disk is a write-once medium, as image data is saved into hard disk 102 for backup purposes only, a residual memory capacity of hard disk 102 does not get decreased wastefully.

Registration works carried out in step S201 of FIG. 5, step S301 of FIG. 6, step S403 of FIG. 7 and step S504 of FIG. 8 will be explained. A registration work of management data that is recorded with linkage to image data will be explained. When shooting information is recorded to an Exif tag of a header portion of an image file recorded in an Exif format at a time of registration, management data is registered based upon the Exif tag. In an APS file, for example, information about the shooting environment and so at a time of shooting is recorded at a magnetic recording portion. Information about a shooting environment and so is recorded into a tag of an image file. On the contrary, in a case of 135 film, as shooting information isn't recorded, it is not recorded to a tag.

An automatic registration work on an image file with recorded tag information is performed, but when there is no tag information, an entry screen comes up on a monitor and a user is requested to entry information. Of information registered in this step, information found in an Exif standard is not only stored in database of image manager 1, but also attached to a tag of original image data when a memory is writable. With this attachment, when handling image data with another image manager other than image manager 1, attached tag information can be utilized.

Figure 9:
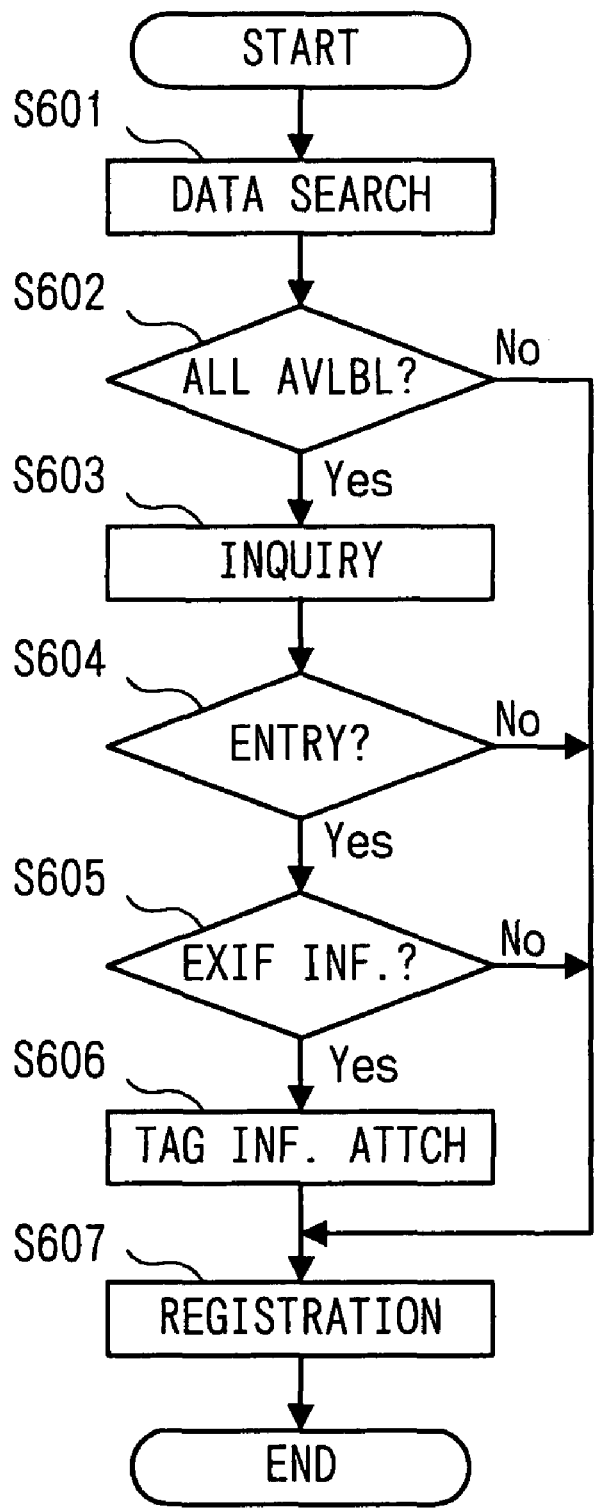
FIG. 9 is a flow chart illustrating a registration work performed by image manager 1.

A registration work by image manager 1 of an embodiment in accordance with this invention will be specifically explained. FIG. 9 is a flow chart illustrating a registration work performed by image manager 1.

In step S601, information attached to image data in a disk is scrutinized. In step S602, it is checked whether all information necessary for a registration as management data of image data is attached. When all information is attached, a flow proceeds to step S607 and when it's not attached, a flow proceeds to step S603.

In step S603, information that is not attached yet is displayed and a user is requested to enter information necessary for a registration. In step S604, it is checked whether necessary information is entered and when entered, a flow proceeds to step S605 and when not entered, a flow proceeds to step S607.

In step S605 subsequent to step S603, it is judged whether there is any information capable of being attached to a header portion of an Exif image file and when there is information, a flow proceeds to step S606 and when no information, a flow proceeds step S607. In step S606, information is attached to a header portion of an Exif file of original image data.

In step S607, a thumbnail image is created from original image data. A thumbnail image is created in an Exif format file and Exif information nearly equal to that of original image data is attached to a thumbnail image. And Exif information and information entered by a user are registered as management data. Naturally, storage locations for original image data, thumbnail image data and backup image data are also registered as management data. Incidentally, independent management data and a thumbnail image aren't created for a backup copy of image data.

As explained in the foregoing, an example that original image data saved into a write-once medium such as CD-R and the like isn't stored in image manager 1 is described. Accordingly, by not storing the same image data into two locations, CD-R and hard disk 102, a wasteful use of hard disk 102 can be avoided.

Also, as another example, it is conceivable that CD-R might get damaged or lost. Thus, an example that as a backup copy of image data, image data in CD-R is stored into hard disk 102 too is described.

When a print of image data stored into CD-R or so is instructed, if CD-R isn't attached into disk drive 103, an instantaneous action can't be taken. However, by backing up copies of image data stored in CD-R into hard disk 102, when a print of image data stored in CD-R or so is instructed, an instantaneous action can be taken using a backup copy of image data even if the CD-R isn't attached.

A control using a backup copy of image data in image manager 1 of an embodiment in accordance with this invention will be specifically explained as follow. An example that a print of image data is instructed will be explained, but another instruction such as appreciation or so rather than a print instruction can be executed in the same way.

Figure 10:
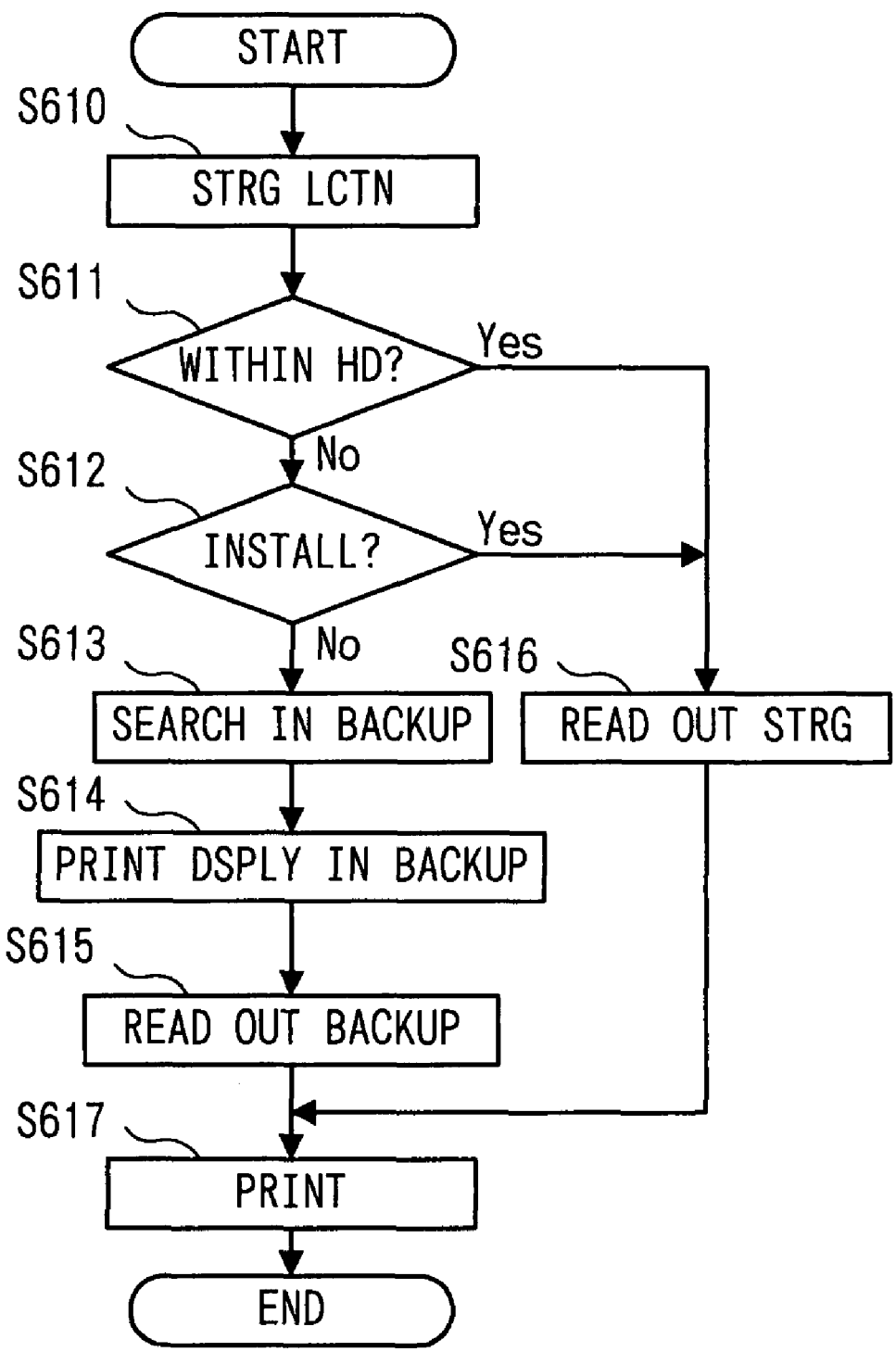
FIG. 10 is a flow chart illustrating a print control performed by image manager 1.

FIG. 10 is a flow chart illustrating a print control performed by image manager 1. This flow starts with an instruction to print specified image data.

In step S610, a storage location of image data under a print instruction is detected from management data. In step S611, it is checked whether image data is stored in hard disk 102 and when stored in hard disk 102, a flow proceeds to step S616 and when not in hard disk 102, a flow proceeds to step S612.

In step S612, it is checked whether a medium storing image data is attached into hard disk drive 103 or memory card slot 104 and the like and when attached, a flow proceeds to step S613. In step S613, a backup copy of image data in hard disk 102 is searched for. In step S614, a text that a print is made using a backup copy of image data is displayed on a monitor.

In step S615, as it is impossible to read out image data from a storage location, a backup copy of image data is read out. In step S616, image data is read out from a storage location and in step S617, this image data is printed.

Accordingly, without taking complicated works such as a search for a medium like CD-R or so storing image data to be printed and its resulting attachment, a print can be easily made.

A function other than a registration in image manager 1 of an embodiment in accordance with this invention will be explained.

A record control that records image data controlled by image manager 1 onto a storage medium like CD-R and the like will be explained.

When image data recorded onto image manager 1 is printed on CD-R, a user is asked if a print is made for handing out a print to someone or cleaning up. Or, with information about CD-R being registered in advance, after image data is printed out onto CD-R, a user is asked if the same image data stored in a hard disk is deleted and when an instruction to delete is given, data about a registration location is changed from a hard disk to CD-R. When a deletion work of image data is not performed, information about CD-R is registered as a location of a copy and a registration work ends.

When one or a plurality of image data to be copied or moved is selected, depending on an empty capacity of an attached medium, image data with the same event as selected image data and a shooting date/time close to that of selected image data is automatically selected. And automatically selected image data is a candidate for image data to be recorded onto CD-R and can be changed.

As in the foregoing, by automatically selecting the number of image data permitted to be recorded onto a medium of a copy location, a selection work for picking up images one by one can be eliminated. And by grouping them into an event and a shooting date/time, a group of image data having an interrelationship among them such as a specific event and the like can be created within the same medium.

More specific management will be explained as below.

Figure 11:
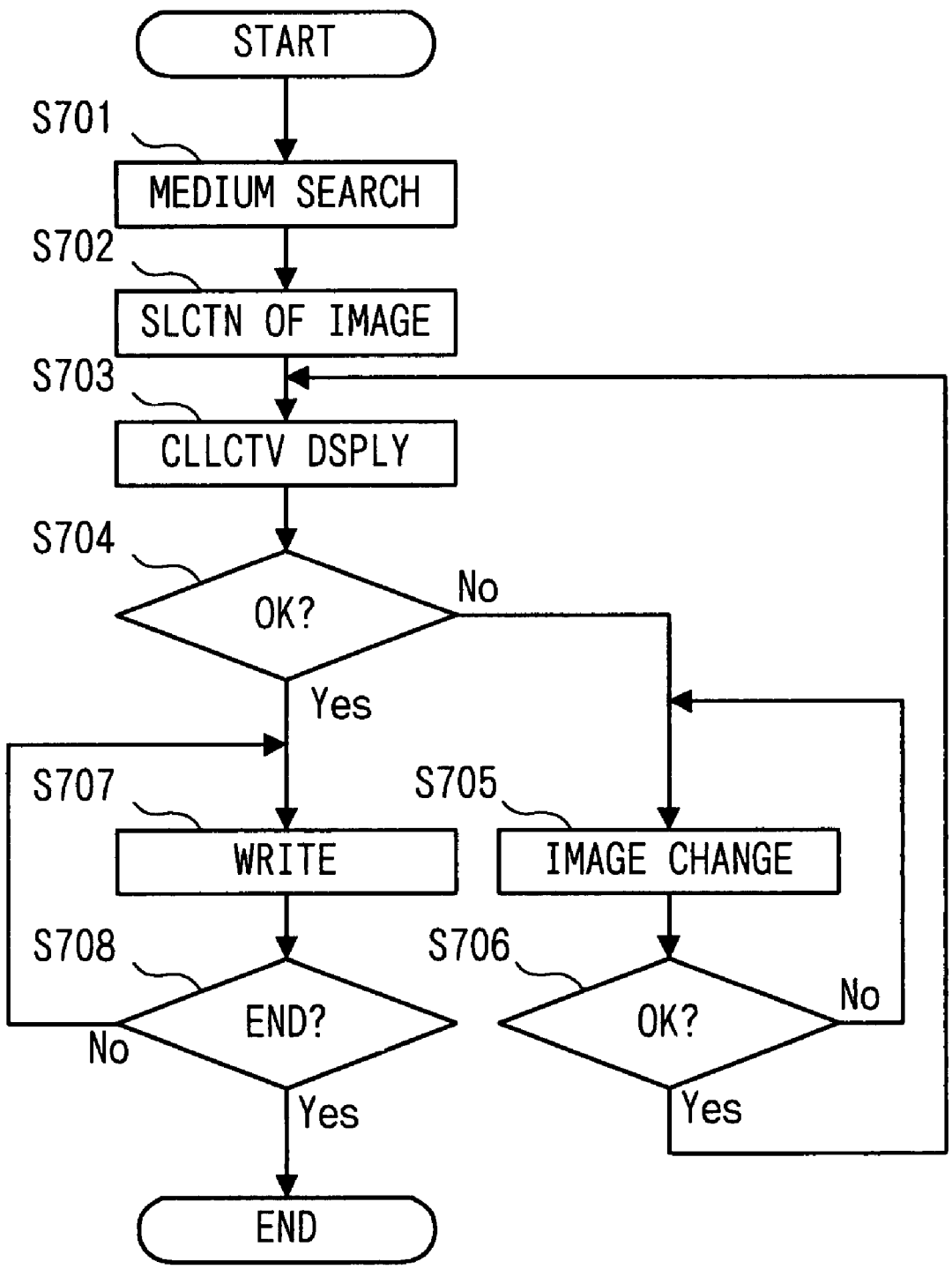
FIG. 11 is a flow chart illustrating a record control performed by image manager 1.

FIG. 11 is a flow chart illustrating a record management performed by image manager 1. This flow starts by specifying one image data and executing a wizard for copying it to an attached medium.

In step S701, the kind and capacity of an attached medium is checked. In step S702, in response to an empty capacity of a medium, a candidate of image data for writing is selected. As a candidate of image data, a group of image data seemingly relevant to specified image data is selected in view of an event, a shooting data/time and so based upon management data. A candidate selection control will be explained later by referring to FIG. 13.

In step S703, a selected group of image data is collectively reproduced. And a user is asked if selected image data is written into an attached medium. In step S704, it is checked whether an instruction to write is given and when given, a flow proceeds to step S707 and when not, a flow proceeds to step S705.

In step S705, a user is asked if selected image data is changed. In step S706, it is checked if a change instruction is given and when the instruction is given, a flow gets back to step S703 and a group of image data including changed image data is collectively reproduced once more. When the instruction is not given, a flow gets back to step S705.

In step S707, selected image data is written into an attached medium. In step S708, it is checked if writing is finished and when writing is finished, a flow ends and when writing is not finished, a flow gets back to step S707 and writing is continued.

Next, a control to be executed subsequent to a flow of FIG. 11 will be explained.

Figure 12:
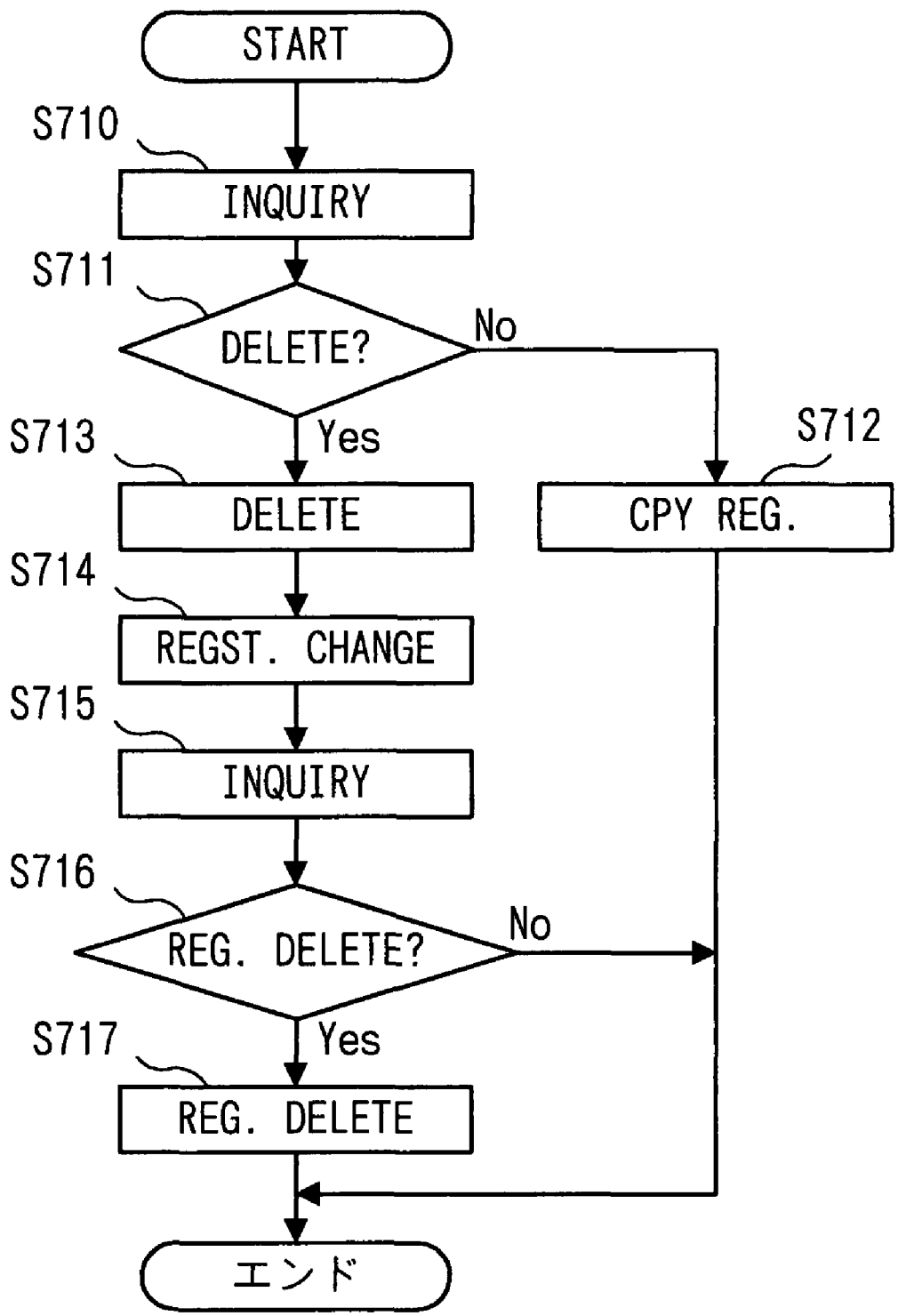
FIG. 12 is a flow chart illustrating a control performed by image manager 1 after writing is finished.

FIG. 12 is a flow chart illustrating a control carried out by image manager 1 after writing is finished. This flow starts subsequent to a flow of FIG. 11.

In step S710, a user is asked if original image data stored into hard disk 102 corresponding to image data copied to an attached medium is deleted. The inquiry's reason here is that there is a possibility that as original image data is copied to an attached medium, image data in hard disk 102 might become unnecessary to a user.

And in step S711, it is checked if a user instructs to delete and when there is an instruction, a flow proceeds to step S713 and when not, a flow proceeds to step S712.

In step S712, copying of image data to a medium is registered to management data of image data. In step S713, image data stored into hard disk 102 corresponding to image data copied to a medium is deleted. And in step S714, a registration of storage location information about original image data in management data is changed from hard disk 102 to a medium that original image data is copied to.

In step S715, a user is asked whether registration information about image data copied to an attached medium is deleted from management data. In step S716, it is checked if a user instructs to delete and when a user does, a flow proceeds to step S717. When not, a flow ends. In step S717, registration information of image data copied to a medium is deleted from management data.

A writing candidate selection control to be performed in step S702 of FIG. 11 will be explained. This control is to select a group of image data related to specified image data and also in response to an empty memory capacity of an attached medium.

Figure 13:
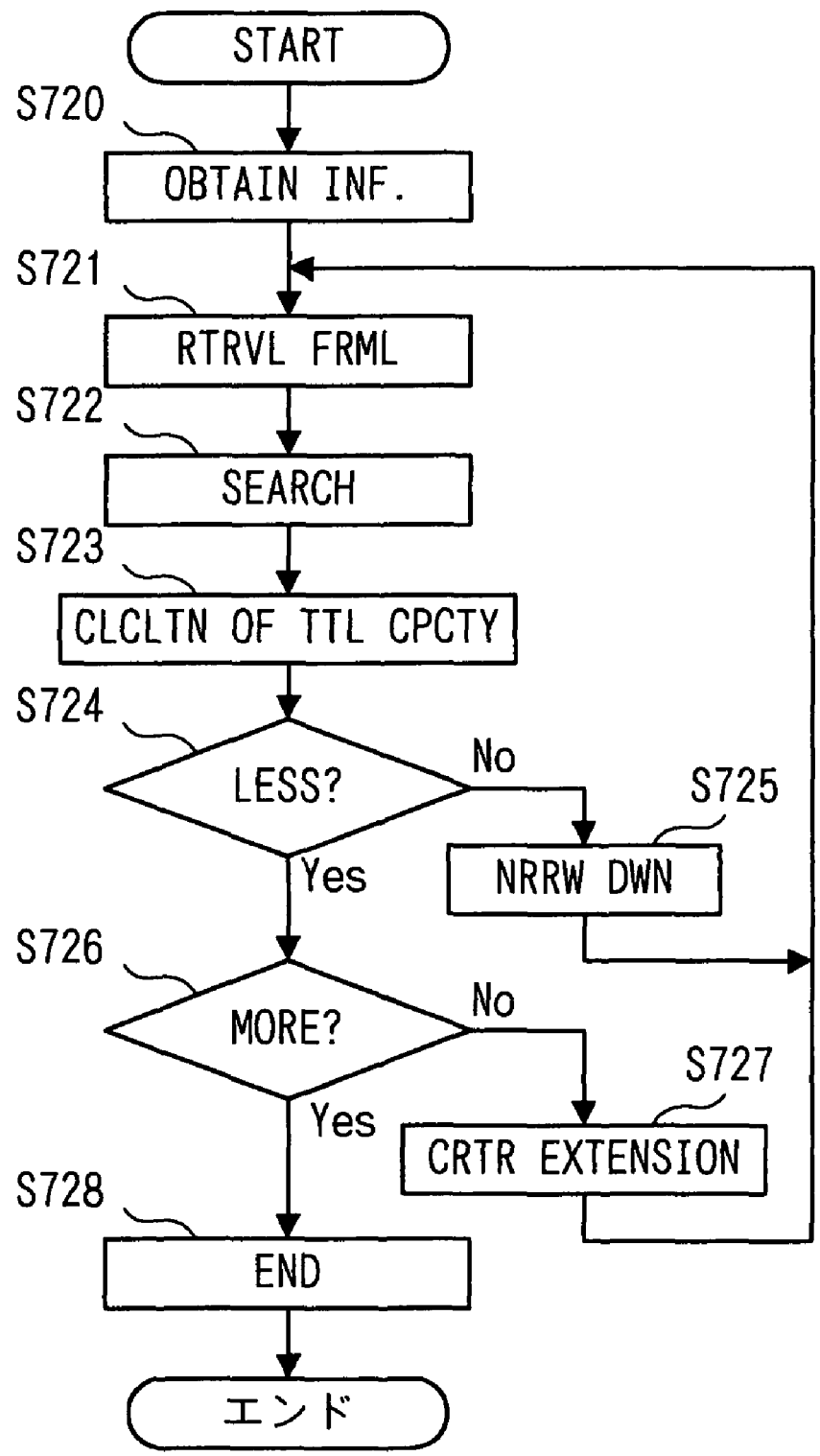
FIG. 13 is a flow chart illustrating a writing candidate selection control performed by image manager 1.

FIG. 13 is a flow chart illustrating a writing candidate selection control performed by image manager 1.

In step S720, search criteria information such as predetermined search criteria, priority order and so is obtained. Search criteria information is information predetermined by a user and sets criteria for selection when selecting a group of image data to be written into a medium.

For example, a user lays down search criteria for use in selection of image data. Specifically, items suitable for search criteria are selected from information registered to management data. As for an item, for instance, there are a model name of a camera in use, a shooting date/time, an owner of image data, a shooting location, an image title, a keyword and the like. Also a user can lay down an item that he or she thinks is important when creating search criteria for selecting image data.

As search items are laid down as in the foregoing, image data grouped into the same camera model, owner, shooting location, title, within-a-given-shooting interval and so can be extracted as a candidate. Further, in addition to search items, a user can lay down a theme-oriented and a capacity-oriented criterion, which will be explained later.

In step S721, search criteria are created. In step S722, with search criteria, management data is searched and image data information meeting search criteria (herein referred to as hit) is retrieved.

In step s723, from information of retrieved image data, a total capacity of image data hit by search criteria is calculated. In step S724, it is checked whether a calculated total capacity is less than an empty capacity of an attached medium and when less than an empty capacity, a flow proceeds to step S726 and when not less than an empty capacity, a flow proceeds to step S725.

In step S725, in order that a total capacity does not exceed an empty capacity, by tightening search criteria, the number of image data to be searched is narrowed down. In step s726, it is checked whether a difference deducting a total capacity from an empty capacity is more than a given capacity. A given capacity used as a criterion of judgment varies depending upon a theme-oriented criterion or a capacity-oriented one that a user sets. When a criterion of judgment is a theme-oriented criterion, a given capacity is set to be large and when a capacity is oriented, a given capacity is set to be small. When a theme-oriented criterion is set, for instance, a group of image data photographed at an event is only extracted without caring about a residual capacity of a medium. In this way, a group of image data having a strong relationship is only extracted and an extraction of a group of image data with a weak relationship is avoided. When a capacity-oriented criterion is set, image data is extracted in such a way that an empty capacity of a medium is filled. When a difference is more than a given capacity, a flow proceeds to step S727 and when a difference is less than a given capacity, a flow proceeds to step S728.

In step S727, to bring a total capacity close to an empty capacity of a medium, the number of image data to be searched is increased by loosing search criteria. And in step S728, thumbnail image data of hit image data is extracted.

In the foregoing embodiment, in view of a theme of image data and an empty capacity of medium, a search formula for a search for a specific image is created. However, by trying to fill an empty capacity, extracted image data might not become a group of image data with consistency and thus, it is better not to perform a control of unreasonably broadening a search range.

Also, to eliminate a waste of an attached medium, image data may be selected based upon a capacity of a medium only, neglecting an image theme. And, any item rather than those as described in the foregoing may be usable in a search.

After a write onto a medium is finished, a label and CD sleeve to be glued on a medium may be created and printed out from an image title, a shooting data/time and so on.

As explained in the foregoing, when image data under management is copied to a medium, image manager 1 controls in such a way that a group of image data with a relationship is collected. And, as image manager 1 controls in such a way that image data is selected in response to an empty capacity of a medium, it's not necessary to select image data while checking an empty capacity one by one.

Another control function of image manager 1 of an embodiment in accordance with this invention will be explained as below. Image manager 1 registers a storage location and an owner of a medium like CD-R and so into management data in addition to shooting information of image data and so on as explained in the foregoing and controls them.

Image manager 1, when image data is digitized image data from a sliver halide film image data, is further provided with a function that registers storage location information about a silver halide film with linkage to image data and controls registered storage location information.

In a case of CD-R produced by a photo lab, as image data lines up in picture frame order on a silver halide film, a frame number corresponding to a silver halide film is automatically input.

A specific control carried out by image manager 1 will be explained.

Figure 14:
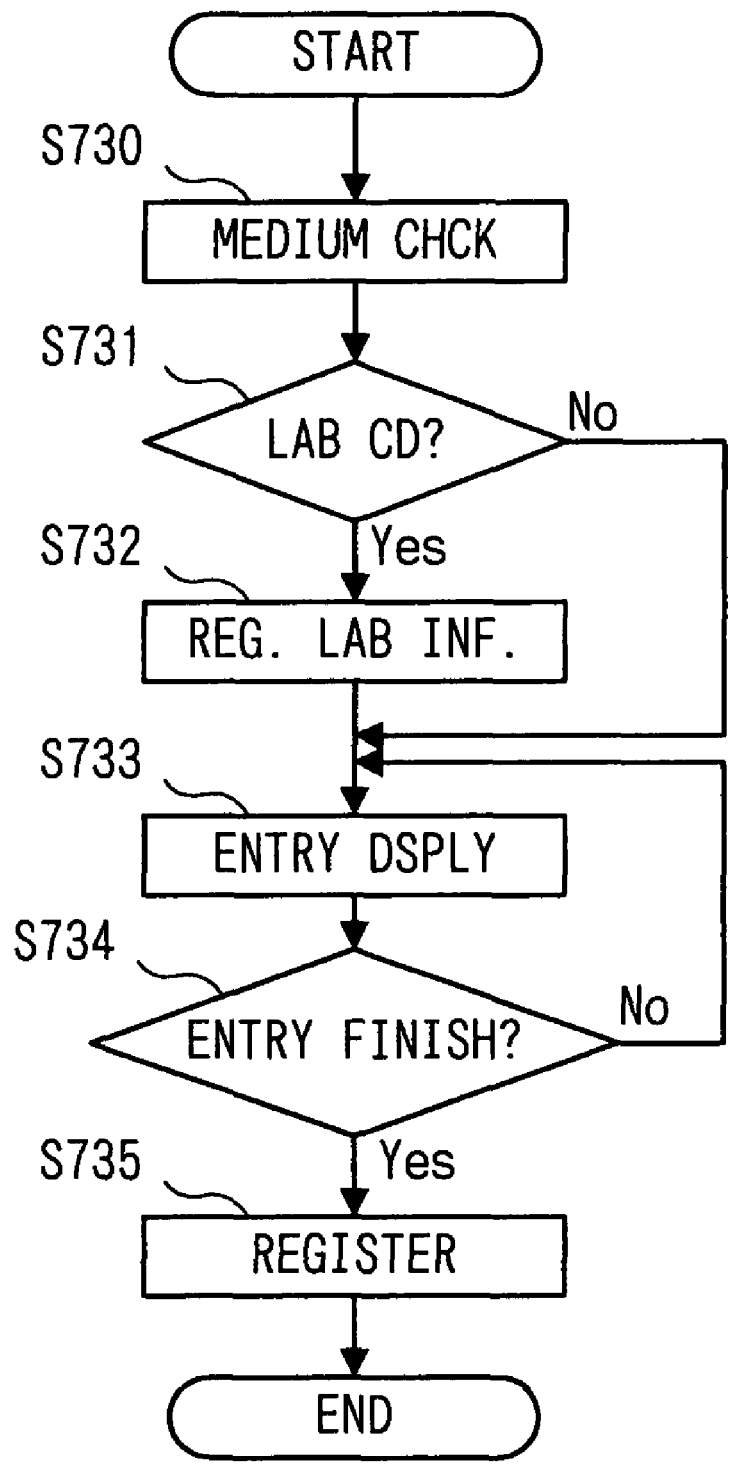
FIG. 14 is a flow chart illustrating a control performed by image manager 1.

FIG. 14 is a flow chart illustrating a control performed by image manager 1. This flow starts with attachment of a storage medium such as CD-R and the like and execution of a registration work.

Firstly, in step S730, an attached storage medium is scrutinized and in step S731, it is checked whether a medium is CD-R produced by a photo lab. When it is CD-R produced by a photo lab, a flow proceeds to step S732 and when not CD-R produced by a photo lab, a flow proceeds to step S733. A serial number, volume label of CD-R and Exif information of image data can judge whether a medium is CD-R produced by a photo lab. For example, information about a date/time of digitalization of image data from a sliver halide film has been already input into Exif information.

In step S732, lab information and frame information are registered into management data. And in step S733, a user is requested to input information that cannot be automatically checked. In this step, in addition to information about image data such as a frame number and so, information about an owner and storage location of a sliver halide film and the like are input. In step S734, it is checked whether input is finished and when input is finished, a flow proceeds to step S735 and when not finished, a flow gets back to step S733. In step S735, sliver halide information is registered into management data.

Accordingly, a user can search for an owner of a sliver halide film and its storage location. Also, a control of silver halide film information and a frame number of image data in this film can become helpful in a search at a time of printing an extra copy of a silver halide film via the Internet. Also, when image data to be printed is selected and a print of an order form is executed, an order form to be placed with a photo shop is created.

Figure 15:
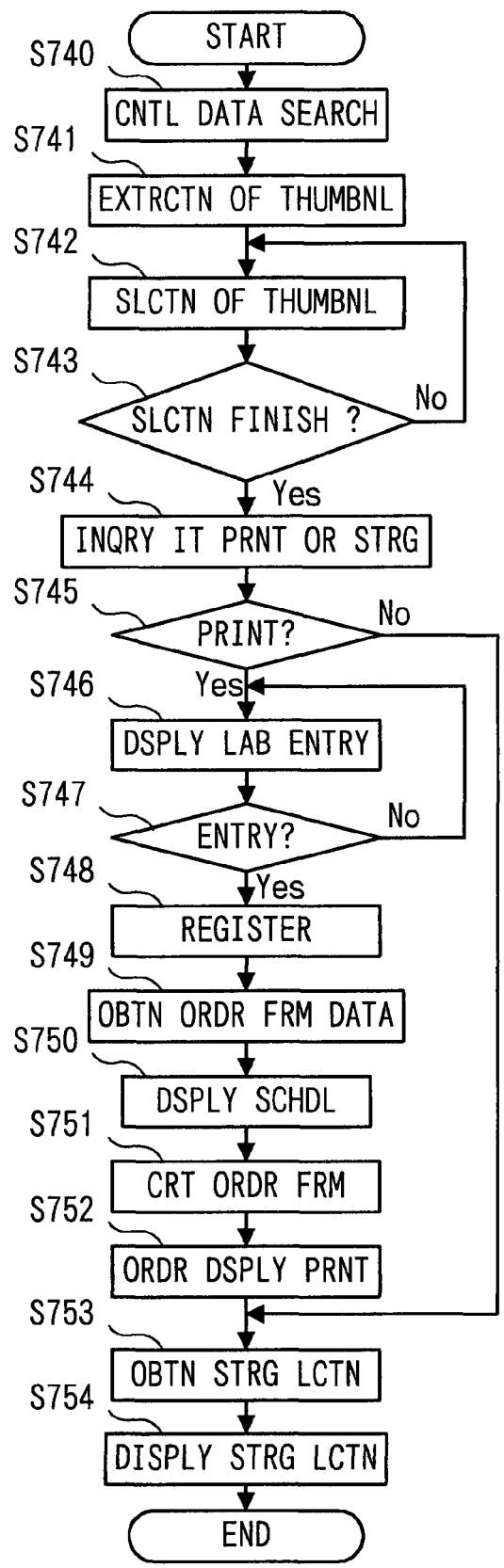
FIG. 15 is a flow chart illustrating a silver halide film control performed by image manager 1.

Functions about a search for a storage location of a silver halide film and a print of an order form to be executed by image manager 1 will be specifically explained as below. FIG. 15 is a flow chart illustrating a management control of a silver halide film performed by image manager 1. This flow starts executing a silver halide film management in a management menu in image manager 1.

In step S740, management data is searched. Then, in step S741, a thumbnail image of image data with silver halide film information stored into management data is extracted. In step S742, an extracted thumbnail image is collectively reproduced on monitor 2. In step S743, it is detected whether a selection of image data is finished. When a selection is finished, a flow proceeds to step S744 and when not, a flow gets back to step S742.

In step S744, a user is asked which one is executed, a print or a storage location search. In step S745, it is detected if a print is executed. When a print is executed, a flow proceeds to step S746 and when a storage location search is executed, a flow proceeds to step S750.

In step S746, a user is asked to enter information about a photo lab or shop accepting a print order. In step S747, it is checked whether photo lab or shop information is input and when input, a flow proceeds to step S748 and when not yet, a flow gets back to step S746. In step S748, information about an extra copy print, an order data/time, a print lab and the like are registered into management data of selected image data. In step S749, an order form template specified by a photo lab or shop is obtained connecting to a website of a photo lab or shop over the Internet. An order form template may be stored into image manager 1 in advance. In step S750, print-processing time schedule information is downloaded from a website and a processing time schedule is displayed.

In step S751, an order form in a state of being filled out with necessary entries for placing a print order of selected image data with a photo lab is created. In step S752, an instruction to print an order form is given to printer 7. Then, in step S753, management data is searched and a storage location of a sliver halide film corresponding to selected image data is extracted. In step S754, a storage location of a sliver halide film is displayed on monitor 2.

As in the foregoing, image manager 1 controls not only digitalized image data but also a sliver halide film. A print order form for a print of a silver halide film is created as well.

A collaboration control with other functional software carried out by image manager 1 of an embodiment in accordance with this invention will be explained. Image manager 1 of this embodiment has a function collaborating with software in a portable remote terminal such as electric organizer 4 and the like. Collaboration with schedule data of scheduling management software used in electric organizer 4 will be explained.

Image manager 1 creates automatically information such as an image title, a shooting location and so from schedule data. When an extracted image file isn't attached with a title or a keyword, a title or a keyword of image data is created from schedule data. Accordingly, image manager 1 becomes helpful in a search for image data.

A collaboration control carried out by image manager 1 will be explained as below. When image manager 1 retrieves image data from a memory card and the like, shooting date/time data of Exif information attached to image data is compared with schedule data. When there is schedule data corresponding to a shooting date/time, content of a schedule is displayed and a user gives a title to image data, referring to displayed content. Or image data is automatically entitled. And a part or a whole part of a text of schedule data corresponding to a shooting date/time is registered as a keyword.

And a text of schedule data is only added to a keyword, not creating a title from a text of schedule data. Contents of image data may be completely different from those of schedule data. Whether contents of image data are in agreement with a text of schedule data requires a confirmation work.

Also, without doing a confirmation work, a keyword only may work. For example, "A's wedding" is written in schedule data and "A's wedding" is added to a keyword of image data photographed at another location rather than a wedding site on the same day. Accordingly, even when a user doesn't remember a shooting date/time of image data he or she wants to see, if it is remembered that image data in question was taken on the day of "A's wedding", it becomes possible to search for image data in question with a keyword, "A's wedding".

Figure 16:
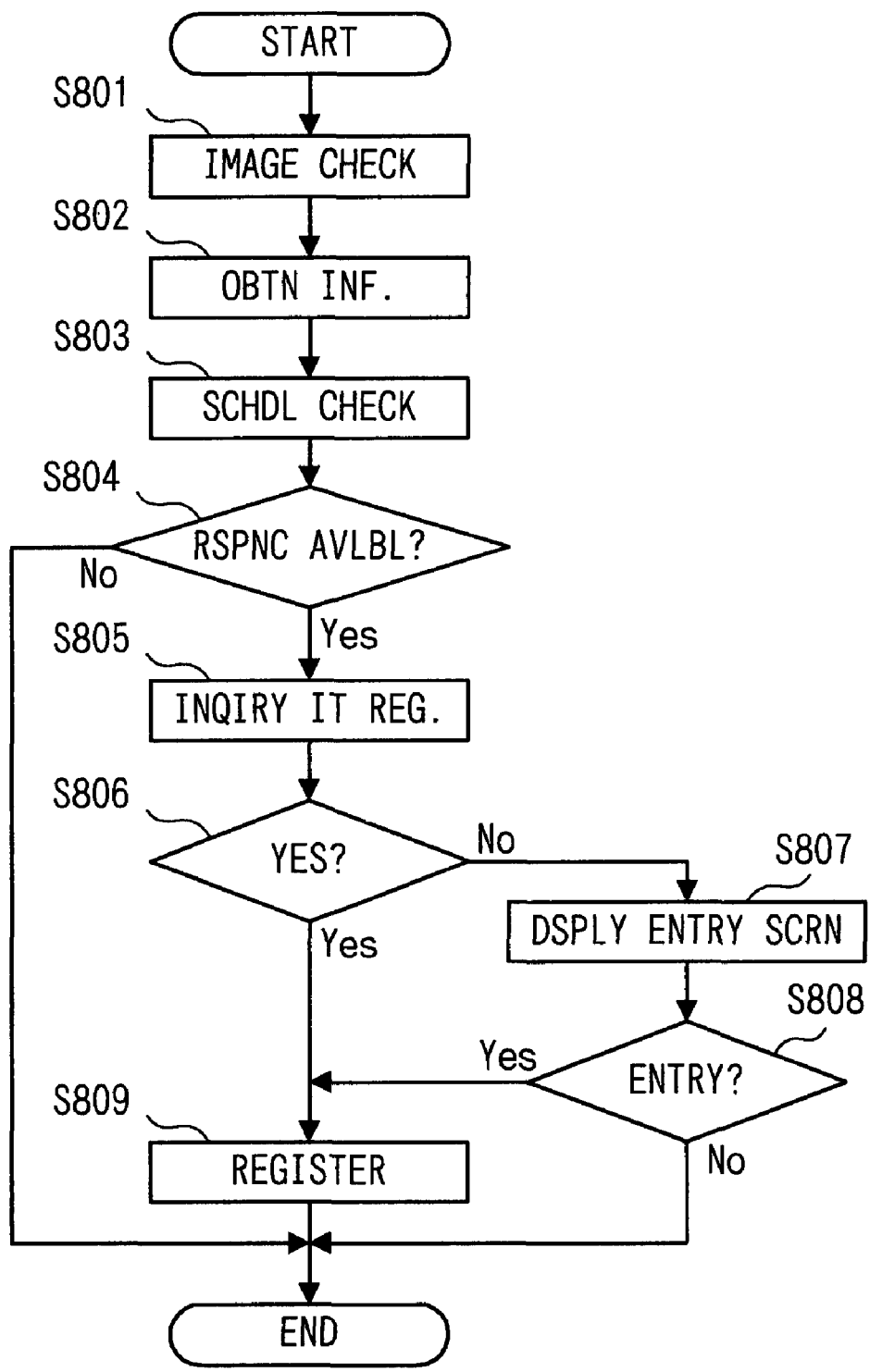
FIG. 16 is a flow chart illustrating a collaboration control with scheduling management software performed by image manager 1.

Collaboration control carried out by image manager 1 will be specifically explained as below. FIG. 16 is a flow chart illustrating a collaboration control with scheduling management software performed by image manager 1. This flow starts with an execution of a registration work.

In step S801, shooting information of image data to be registered is searched. In step S802, shooting date/time information of image data is obtained. In step S803, schedule data is searched communicating with electric organizer 4. In step S804, it is checked whether there is schedule data corresponding to shooting date/time information of obtained image data. When corresponding data exists, a flow proceeds to step S805 and when does not exist, a flow ends.

In step S805, a user is asked whether a word extracted from schedule data is registered or not while displaying a title and a keyword respectively. For example, when schedule data says that A's wedding party was held at H Hotel. "A's wedding" is extracted as a word in a title. Similarly, as a word in a keyword, "H Hotel", "A's" and "wedding" are extracted.

In step S806, it is checked whether a registration is instructed. When a registration is instructed, an extracted word is registered as a title or a keyword. When no registration is instructed, an entry screen for a user to manually enter a title and a keyword is displayed on a monitor. When a registration is instructed, a flow proceeds to step S809 and when no registration is instructed, a flow proceeds to step S807.

In step S807, an entry screen for a manual input of a title and a keyword is displayed. In step S808, it is checked whether data is entered and when data is entered, a flow proceeds to step S809. When not entered, a flow ends with no registration.

In step S809, a title or a keyword is registered into management data with linkage to image data.

Accordingly, when there is schedule data of scheduling management software corresponding to a shooting date/time of image data, schedule data can be utilized for a title, a keyword and the like of image data.

In the foregoing embodiment, image manager 1, when there is schedule data corresponding to a shooting date/time of image data to be registered, registers schedule data into management data as a title and keyword of image data.

In the foregoing control, it is checked whether there is data just matching a shooting date/time, but even if data doesn't completely match, data close to a shooting date/time may be extracted. For example, when there are schedule data before and after a shooting date/time, data before a shooting date/time is prioritized.

Image manager 1 has a function that utilizes schedule data at a time of a search for and extraction of image data, not registers schedule data into management data. For example, when a search is performed with "A's wedding" as a keyword, a date/time of "A's wedding" is obtained from scheduling management software and image data with this shooting date/time is extracted.

A control carried out by image manager 1 will be specifically explained as below.

Figure 17:
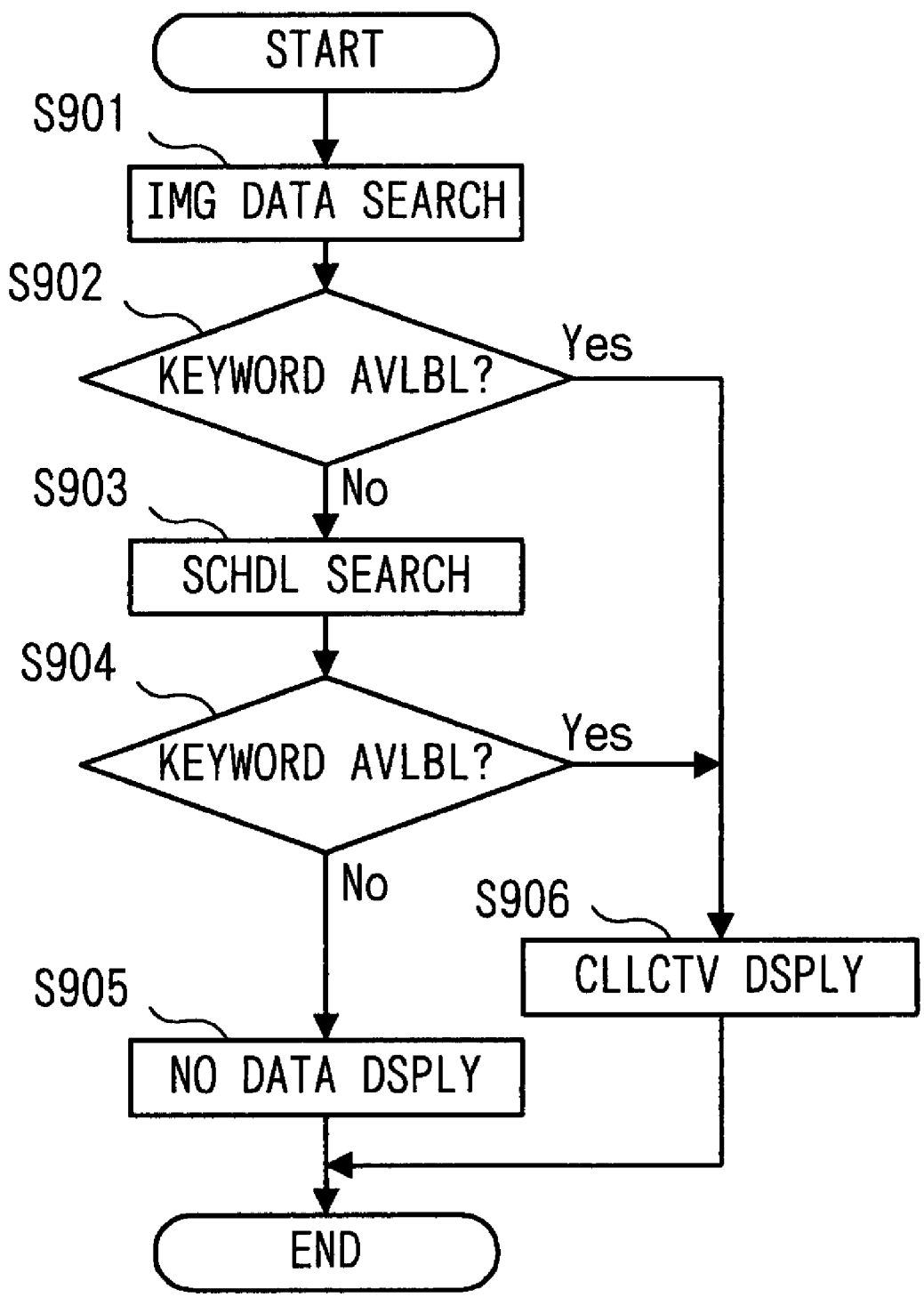
FIG. 17 is a flow chart illustrating a search and extraction control performed by image manager 1.

FIG. 17 is a flow chart illustrating a search and extraction control performed by image manager 1. This flow starts with input of a given keyword and execution of a search and extraction.

In step S901, management data of stored image data is searched. In step S902, it is checked whether there is image data having an entered keyword. When there is data, a flow proceeds to step S906 and when not, a flow proceeds to step S903.

In step S903, as image data with a keyword entered into management data does not exist, schedule data is searched communicating with electric organizer 4. Image manager 1 is so configured as to be able to search for schedule data at work over scheduling management software.

In step S904, it is checked whether there is an entered keyword in schedule data. When a keyword exists, a flow proceeds to step S906 and when doesn't exist, a flow proceeds to step S905. In step S905, image manager 1 displays on a monitor that there is no image data with a corresponding keyword. In step S906, all image data with a corresponding keyword are collectively reproduced.

In the foregoing embodiment, schedule data is searched communicating with electric organizer 4. However, a search may collaborate with scheduling management software in image manager 1, not with scheduling management software in electric organizer 4.

Also, image manager 1 does not communicate with electric organizer 4 every time a search is executed, but schedule data may be downloaded into image manager 1 when a mobile terminal is connected to.

In the foregoing control, collaboration with schedule data of scheduling management software is introduced as an embodiment, but another data may be usable. For example, collaboration with e-mail data and so in mobile phone 5 may also go well.

Collaboration between image manger 1 and mobile phone 5 will be explained in detail as below.

On top of e-mail data, information about records of telephone calls, schedule data and so on are stored into mobile phone 5. Image manager 1 utilizes such information as management data. Also, image manager 1 utilizes information as management data by prioritizing an order of information in mobile phone 5.

Figure 18:
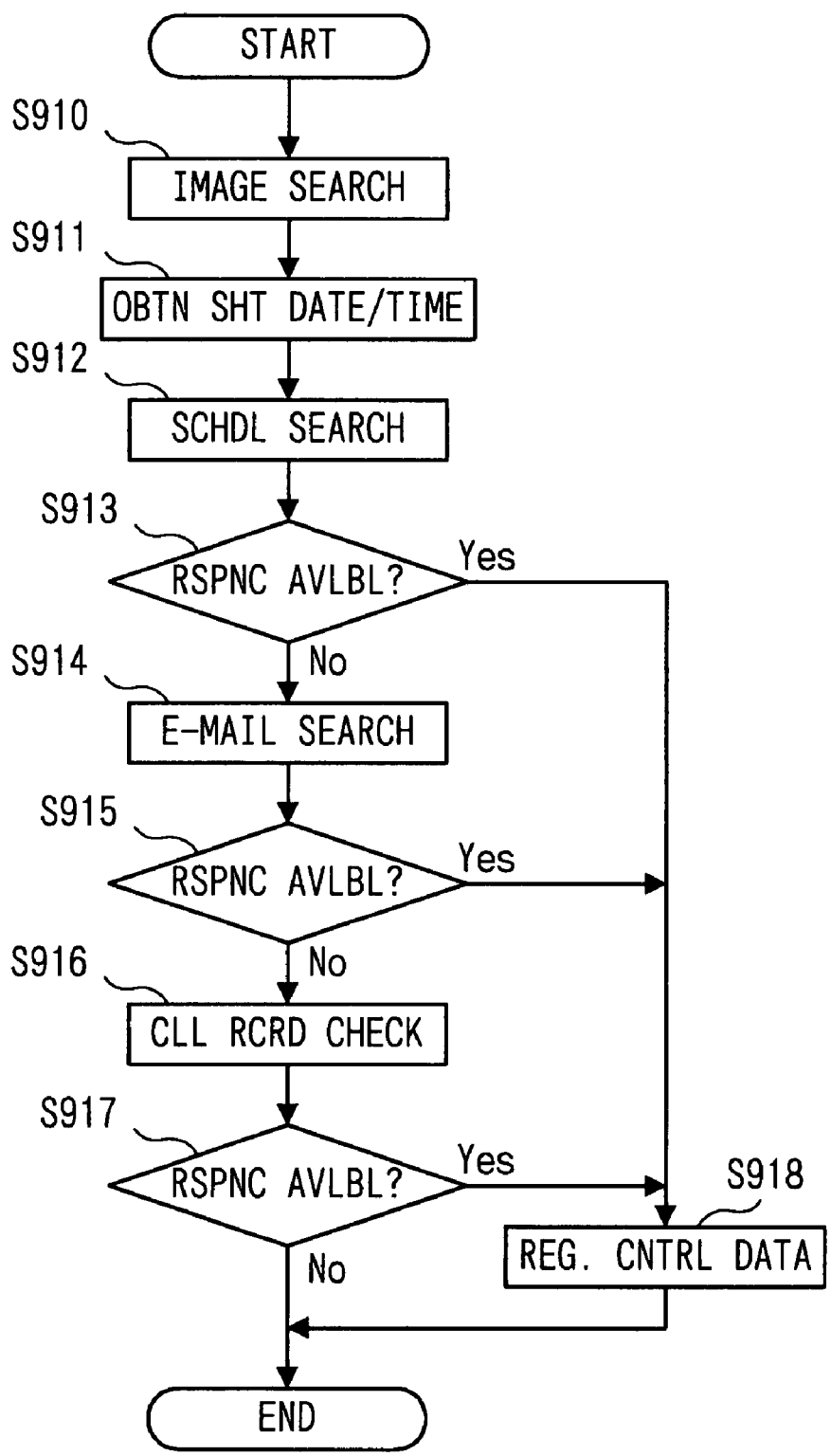
FIG. 18 is a flow chart illustrating a control in conjunction with mobile phone 5 performed by image manager 1.

FIG. 18 is a flow chart illustrating a registration control through collaboration with mobile phone 5 performed by image manager 1. This flow starts with an execution of a registration work.

In step S910, shooting information of image data to be registered is searched. In step S911, shooting date/time information of image data is obtained. In step S912, schedule data is searched communicating with mobile phone 5. It is checked whether there is schedule data corresponding to obtained shooting date/time information of image data. In step S913, it is judged whether there is data corresponding to obtained shooting date/time information of image data and when there is data, a flow proceeds to step S918 and when not data, a flow proceeds to step S914.

In step S914, e-mail data is searched communicating with mobile phone 5. It is checked whether there is e-mail data sent or received at a shooting date/time of obtained image data. In step S915, it is judged whether there is e-mail data sent or received at a shooting date/time of image data and when there is corresponding e-mail data, a flow proceeds to step S918 and when not corresponding e-mail data, a flow proceeds to step S916.

In step S916, chronicle data of telephone calls is searched communicating with mobile phone 5. And it is checked whether there is data called on/at an obtained shooting date/time of image data. In step S917, it is judged whether there is data called on/at an obtained shooting date/time of image data and when there is call data, a flow proceeds to step S918 and when no call data, a flow ends since there is no new data for a registration.

In step S918, a word extracted from mobile phone 5 is registered into management data as a title or a keyword. This word may be extracted from a mail title or a mail text of e-mail data in mobile phone 5. And data of the party on the other end of phone call is extracted from call data of telephone calls.

Next, a control of portable storage device 6 carried out by image manager 1 of an embodiment in accordance with this invention will be explained.

Image manager 1 of an embodiment in accordance with this invention is provided with a function that obtains and registers image data stored into portable storage device 6. Portable storage device 6 herein has a built-in hard disk for storage of data and is provided with a connector to communicably connect to image manager 1 and a digital camera. Further, portable storage device 6 is provided with a card slot that obtains image data photographed with a digital camera via a memory card. And portable storage device 6 goes outside with a digital camera and it stores image data taken with a digital camera via a connector or a card slot.

A digital camera can increase an empty capacity of a memory in a digital camera in use by erasing image data stored into portable storage device 6 from the memory in the camera and thus, a picture can be taken successively. A hard disk of portable storage device 6 has a sufficient capacity for image storage on occasions such as a trip and the like.

Image manager 1 registers and stores image data stored into portable storage device 6 into hard disk 102, connecting to portable storage device 6.

There is a case that portable storage device 6 controls stored image data independently. Image manager 1 is provided with a program that converts various kinds of management data of portable storage device 6 to data that image manager 1 can utilize. This conversion program is stored into hard disk 102.

Therefore, by collaboration with portable storage device 6, image manager 1 can control image data finely. Image manager 1 converts obtained management information for its own use software and utilizes it. For example, when a GPS element is built into portable storage device 6, information about a location at a time of storing an image can be obtained.

Image manager 1 receives image registration data controlled by portable storage device 6, converts data to data for use in image manager 1 and registers converted data. Accordingly, image manager 1 needn't extract data attached to image data one by one and when information being not attached to image data is newly entered, image manager 1 can obtain entered information as new information.

In a case where image manager 1 is connected to portable storage device 6, a registration control of image data stored into portable storage device 6 to be carried out by image manager 1 will be explained as below.

Figure 19:
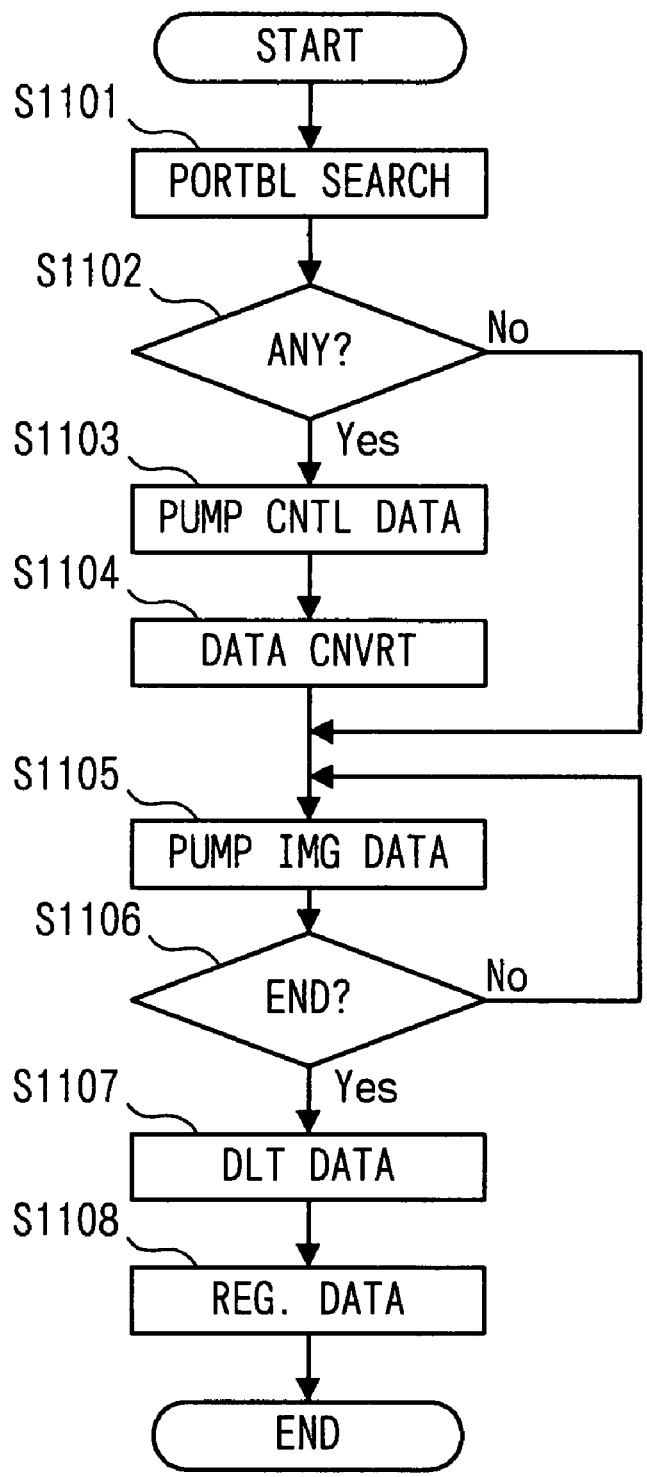
FIG. 19 is a flow chart illustrating a control performed by image manager 1.

FIG. 19 is a flow chart illustrating a control performed by image manager 1. This flow starts with a connection of portable storage device 6 to image manager 1.

In step S1101, image manager 1 obtains information about portable storage device 6 and checks whether portable storage device 6 is capable of collaborating with image manager 1. Portable storage device 6 capable of collaborating is a device that has management data controlling stored image data which image manager 1 can utilize. Naturally, it is judged that portable storage device 6 having no management data cannot collaborate.

In step S1102, it is judged whether connected portable storage device 6 is capable of collaborating with image manager 1 and when capable, a flow proceeds to step S1103 and when not capable, a flow proceeds to step S1105.

In step S1103, management data stored into portable storage device 6 is downloaded. In step S1104, by starting up management data program corresponding to downloaded management data, management data is converted.

In step S1105, image data is downloaded and stored into hard disk 102. In step S1106, it is checked whether a download work is finished and when finished, a flow proceeds to step S1107. When not finished, a flow gets back to step S1105 and a download work is continued.

In step S1107, image data in portable storage device 6 is erased. Instead of automatic erasing of downloaded image data, a user may be asked if downloaded image data is erased. And management data in portable storage device 6 is overwritten. In step S1108, a registration work of downloaded image data is performed.

Like the foregoing, when a device connecting to image manager 1 controls its own image management, image management data is obtained from a device and a registration work of image data based upon obtained image management data enables to simplify a complicated control registration.

A function of image manager 1 in a system transferring image data photographed with digital camera 3 onto server computer 8 and the like will be explained. Digital camera 3, before transferring image data onto a transferred party such as server computer 8 and the like, creates contracted image data for reproduction purposes on a monitor of digital camera 3 and stores it onto a memory inside digital camera 3 with information about a transferred party receiving transferred image data.

Contracted image data in digital camera 3 is stored in an Exif file and it has the same information about a shooting date and time, a shutter speed, a strobe light and so as original image data. And since information about image data size and so is a contracted size, it is different from original image data. Also, contracted image data has information indicating that it is not original image data. A registration control carried out by image manager 1 will be specifically explained as below.

Figure 20:
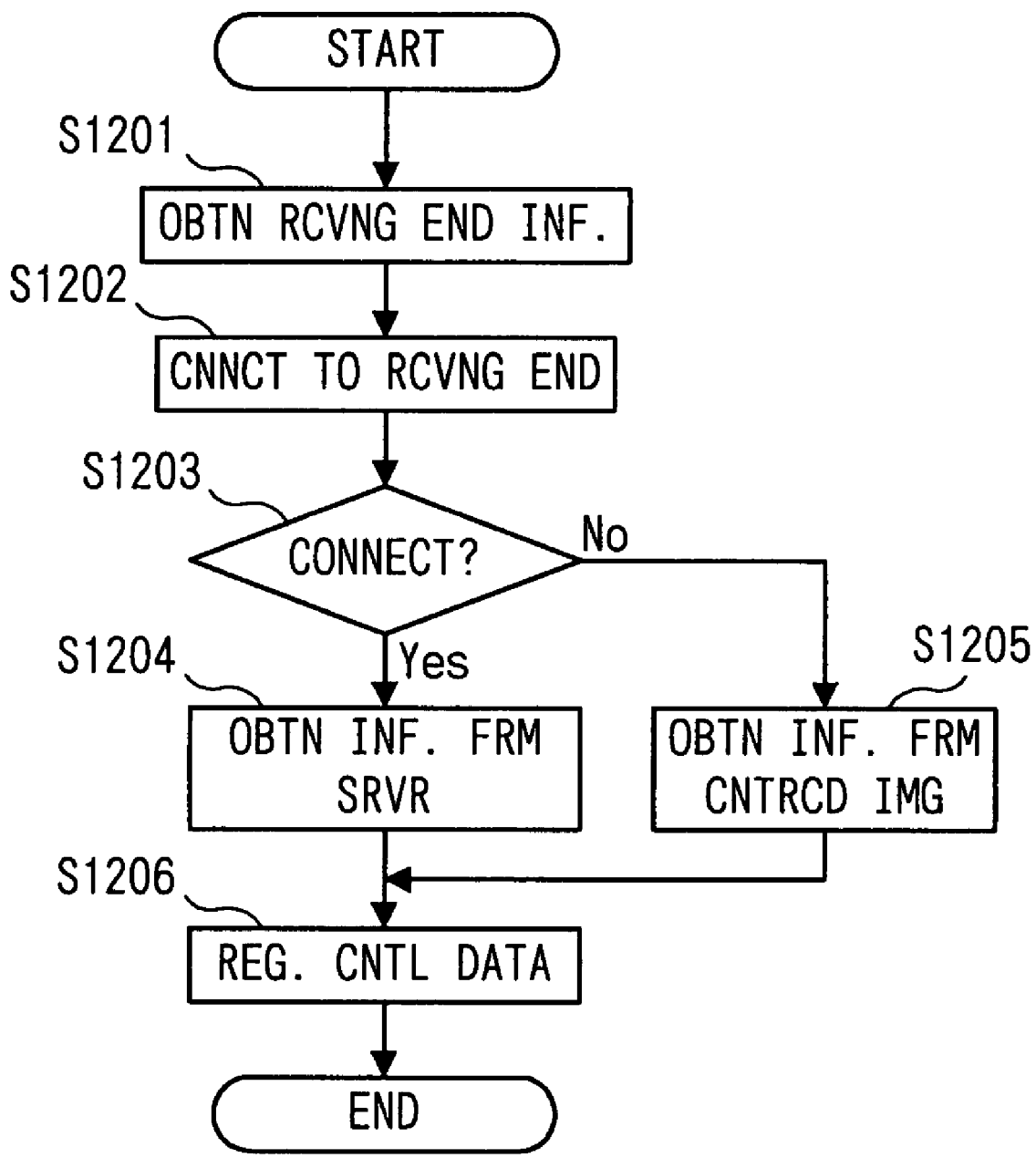
FIG. 20 is a flow chart illustrating a registration control performed by image manager 1.

FIG. 20 is a flow chart illustrating a registration control performed by image manager 1. This flow starts when digital camera 3 is connected to connector 105 of image manager 1. Also, it is assumed that digital camera 3 transferred image data onto server computer 8.

In step S1201, information about a transferred party is obtained from digital camera 3. In step S1202, based upon obtained information about a transferred party, image manager 1 tries to connect to server computer 8 and in step S1203, it is judged whether server computer 8 is connected. When connected, a flow proceeds to step S1204 and when not connected, a flow proceeds to step S1205.

In step S1204, all image data corresponding to information about a transferred party available in digital camera 3 are connected and shooting information attached to an Exif tag of original image data is obtained. In step S1205, when image manager 1 cannot connect to an image of original image data, image manager 1 obtains shooting information recorded onto an Exif tag of contracted image data in digital camera 3.

In step S1206, management data is registered based upon obtained information. In step S1207, image manager 1 erases thumbnail image data in digital camera 3 corresponding to image data that registers management data.

In the foregoing, an embodiment of a registration work without downloading original image data from server computer 8 is introduced.

But, among server computers available in the market, there is a server computer that sets a time limit allowed to store image data in a server computer. Image data exceeding beyond this time limit is automatically erased. Also, some server computer has a capacity limit allowed to store image data, and then, image data exceeding this limit cannot be stored. In these server computers, original image data is downloaded onto hard disk 102 of image manager 1 and image data of a server computer is erased.

A control by image manager 1 will be explained in detail as below.

Figure 21:
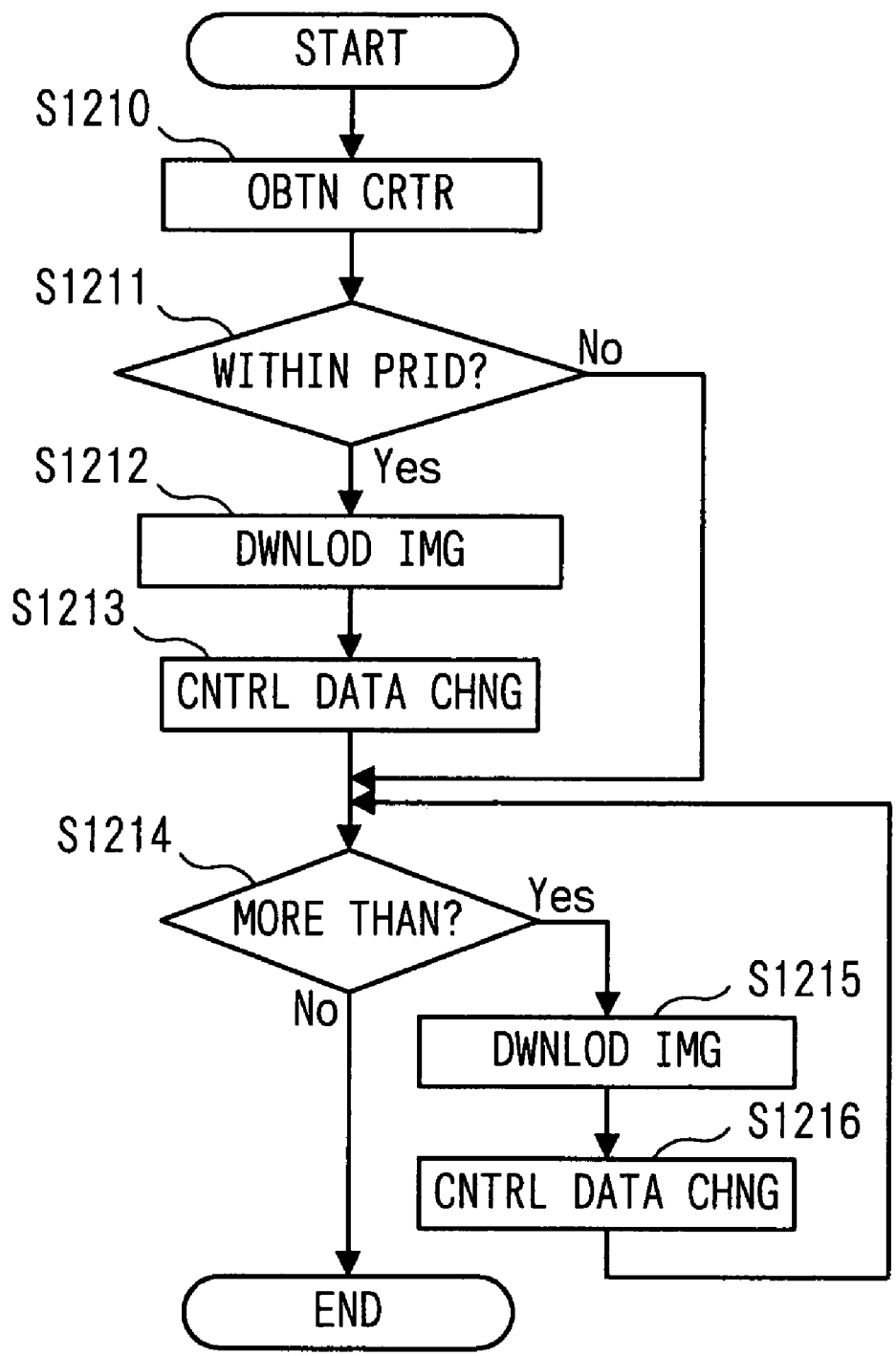
FIG. 21 is a flow chart illustrating a control performed by image manager 1.

FIG. 21 is a flow chart illustrating a control performed by image manager 1. This flow starts connecting to server computer 8.

In step S1210, information about a usage condition of server computer 8 is obtained. In step S1211, it is judged whether an allowable storage period of image data in server computer 8 is within a given time limit and when it is within, a flow proceeds to step S1212. When it passes a given limit, a flow proceeds to step S1214.

In step S1212, image data of which an allowable storage period is within a given time limit is downloaded onto hard disk 102 and downloaded image data is erased from server computer 8. In step S1213, contents of a registration of management data about a storage location of downloaded image data are changed.

In step S1214, it is judged whether a capacity of image data stored into server computer 8 is more than a given capacity and when it is more than a given capacity, a flow proceeds to step S1215. When not more than a given capacity, a flow ends. In step S1215, specific image data is downloaded onto a hard disk and downloaded image data is erased from server computer 8. In step S1216, contents of a registration of management data about a storage location of downloaded image data are changed and a flow gets back to step S1214.

Accordingly, image data stored into server computer 8 is not lost and a memory capacity enabling to newly store image data at any time can be secured in a server computer.

Another function in image manager 1 of an embodiment in accordance with this invention will be explained.

It is seen that single image manager 1 is shared among several people such as a family. Unauthorized access to image data registered by other person causes infringement on other person's privacy.

And it is also seen that single digital camera 3 is shared between several people such as a family or friends or so. When several people share the same digital camera 3, an exclusive memory card for each of them forestalls infringement on privacy. However, as a memory capacity built into or loaded into digital camera 3 gets larger, it is conceivable that a single memory is shared by several people. In a case where digital camera 3 was used by three people, when all image data stored into digital camera 3 are automatically downloaded and registered, image data photographed by other person become registered too.

And it is seen that single digital camera 3 is shared by a business purpose and a private use. In this case, it is inconvenient that image data taken for a business purpose is automatically stored into a privately owned image manager.

Image manager 1 of an embodiment has various functions to solve the foregoing inconveniences. Functions will be specifically explained as below.

Image manager 1, to protect privacy, has a function enabling to not access to image data registered by other person. When there is a plurality of users sharing the same device, a user logs in at a time of using image manager 1 with a login ID and a password individually assigned to each of them as commonly practiced in a PC and the like. Accordingly, by discriminating an authorized user from unauthorized users with an ID and a password, image manager 1 limits access to image data. Image manager 1 realizes access limitation in such a way that nobody is permitted to access image data registered during a login of a user unless the same user logs in.

And image manager 1 has a function that differentiates an owner of image data from image data photographed by a plurality of persons and registering the owner. Image manager 1 has a function that, via input of image data extraction criteria for specifying an owner, registers only image data satisfying the criteria. An enterable criteria is tag information of an Exif such as a name of a camera maker, a camera model name, an image title, a keyword, an image size, a shooting date/time, a user name and so on top of file management information such as a folder name, a file name and so.

A specific control carried out by image manager 1 will be explained as below.

Figure 22:
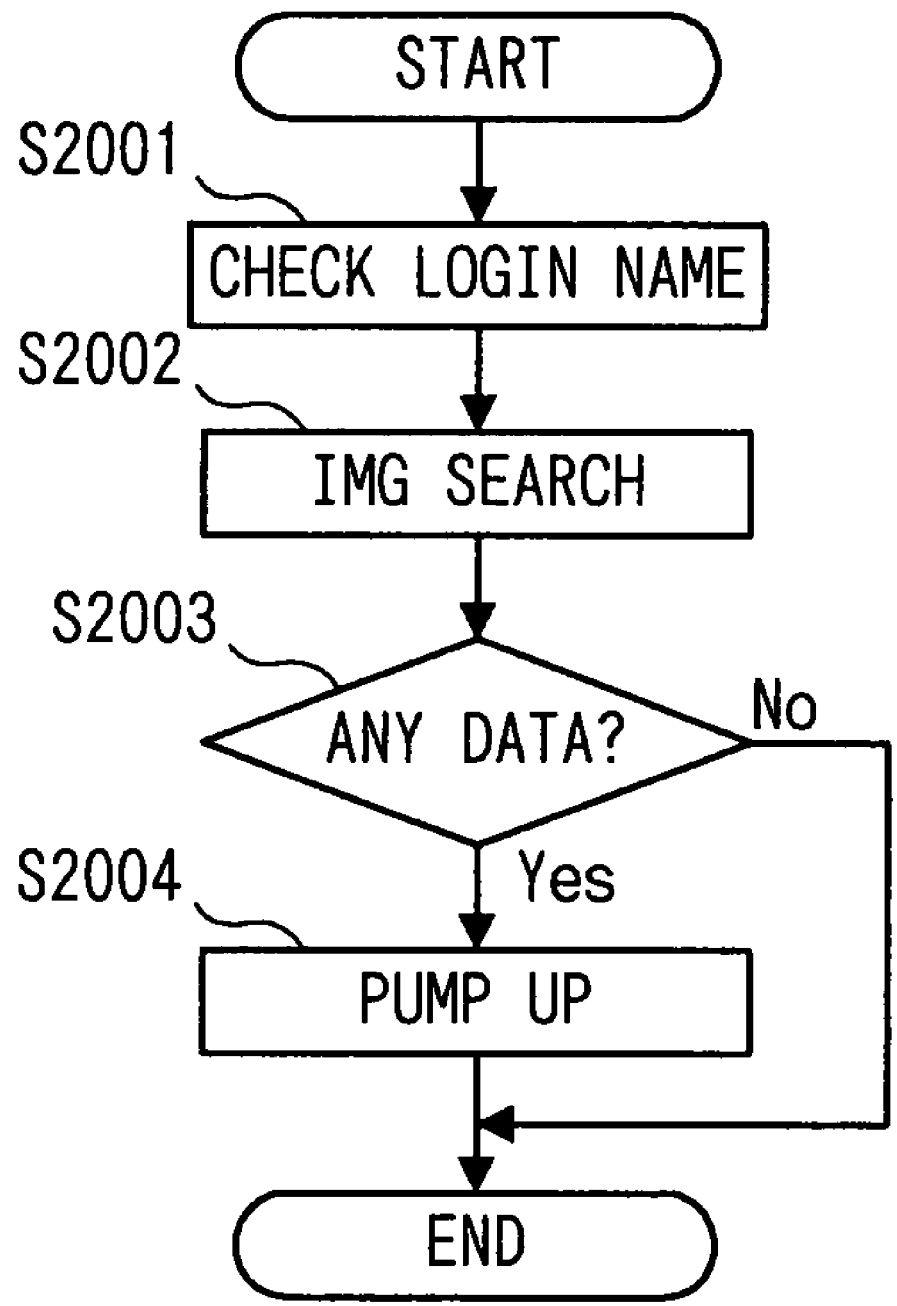
FIG. 22 is a flow chart illustrating a control performed by image manager 1.

FIG. 22 is a flow chart illustrating a control performed by image manager 1. This flow starts detecting that digital camera 3 is connected to connector 105 or a memory card is connected to memory card slot 104. The following explanation will introduce an embodiment of digital camera 3 being connected.

In step S2001, it is detected who logs in to image manager 1. In step S2002, image data in connected digital camera 3 is searched.

In step s2003, it is checked whether there is image data satisfying search criteria specified by a login user after image data of digital camera 3 was searched and when there is image data, a flow proceeds to step S2004. When there isn't image data, a flow ends. In step S2004, image data satisfying search criteria specified by a login user is extracted and registered.

When digital camera 3 has a login function to specify a user as image manager 1 does, image data can be automatically registered from login information without laying down search criteria and so through image manager 1.

In the foregoing control, an example that image data of a login user is detected, only extracted and registered is introduced. Following another control will extract and register all image data of digital camera 3. And when registering, information about a login user is registered into management data. Then, access, including a reproduction and so, to image data other than those of a login user is made impossible.

Figure 23:
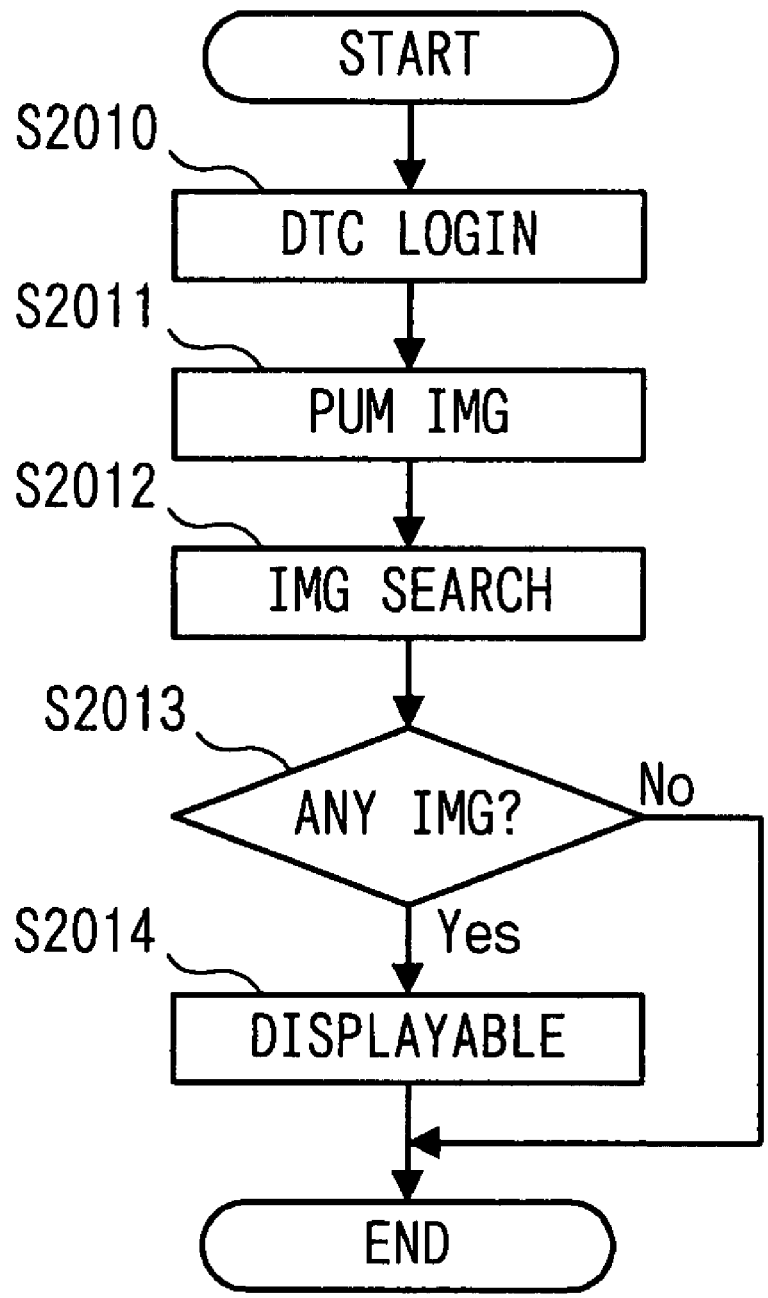
FIG. 23 is a flow chart illustrating a registration control performed by image manager 1.

FIG. 23 is a flow chart illustrating a registration control performed by image manager 1.

This flow starts detecting either connection of digital camera 3 to connector 105 or attachment of a memory card into memory card slot 104. A following example shows that digital camera 3 is connected to connector 105.

In step S2010, a user logging in to image manager 1 is searched. In step S2011, all image data of digital camera 3 is downloaded and shooting information data of image data is registered into management data. And information such as a shooter, an owner and so is also registered into management data.

In step s2012, image data under registration are searched. In step S2013, it is judged whether there is image data shot and owned by a user logging in to image manager 1 and when there is, a flow proceeds to step S2014 and when there is not, a flow ends. In step S2014, a thumbnail image of image data shot and owned by a login user is collectively reproduced and can be available for use.

As controlled in the foregoing, image data can be registered efficiently and nobody can infringe on other's privacy.

Next, an example that no original image data is downloaded and a registration is performed only into management data will be explained. For example, this control is performed when a memory card attached into digital camera 3 is a write-once memory.

Figure 24:
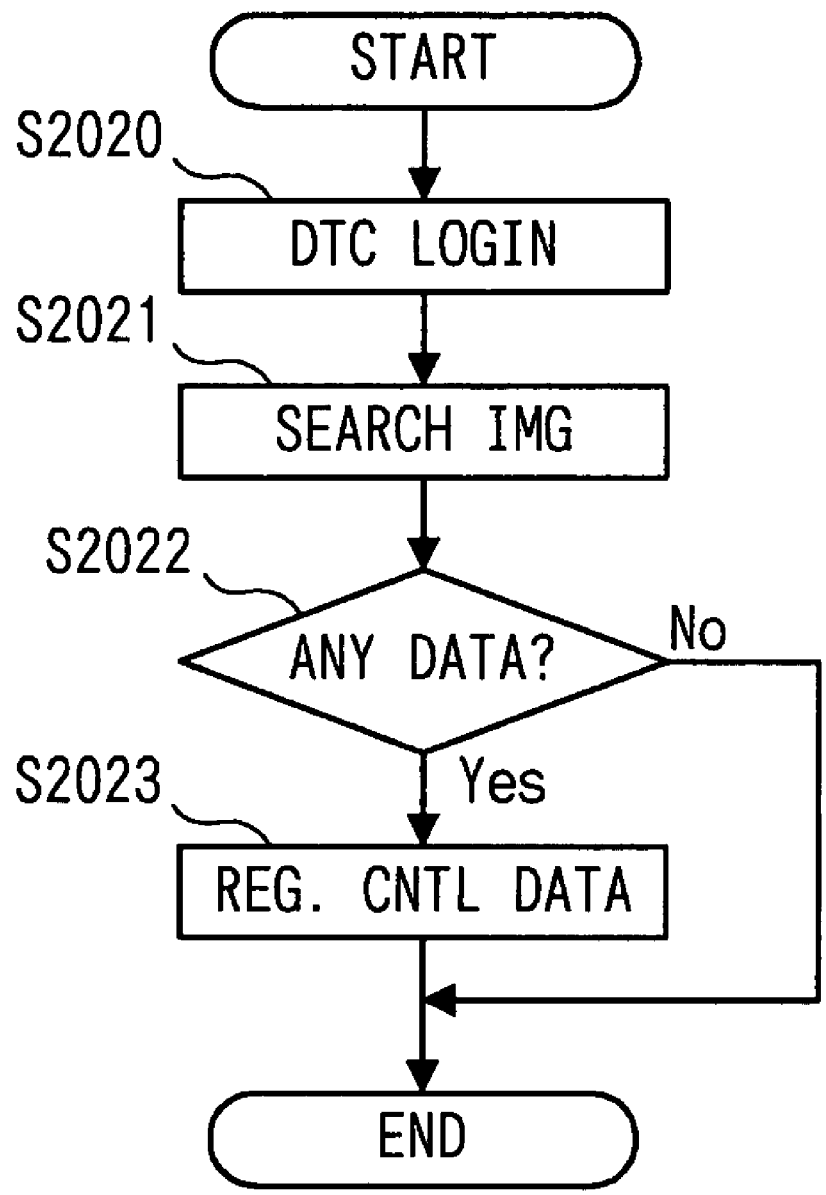
FIG. 24 is a flow chart illustrating a control performed by image manager 1.

FIG. 24 is a flow chart illustrating a control performed by image manager 1.

This flow starts connecting digital camera 3 attached with a write-once medium to image manager 1.

In step S2020, a user logging in to image manager 1 is searched. In step S2021, image data in connected digital camera 3 is searched. In step S2022, it is judged whether there is image data satisfying criteria specified by a login user after image data was searched and when there is, a flow proceeds to step S2023 and when there is not, a flow ends. In step S2023, only image data satisfying criteria specified by a login user is registered into management data.

A control for sending and storing image data photographed with digital camera 3 into a server computer via a network like the Internet will be explained.

Figure 25:
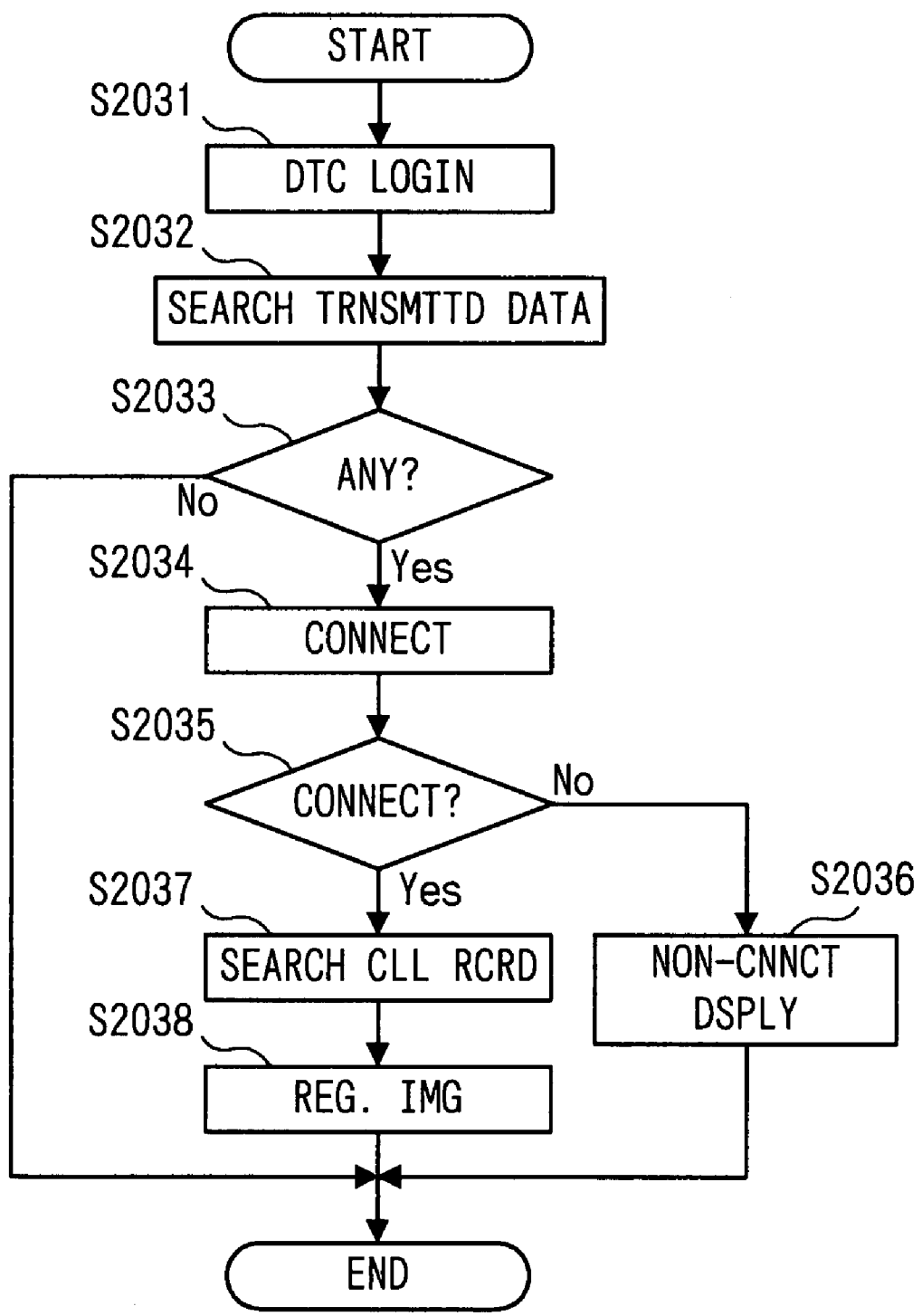
FIG. 25 is a flow chart illustrating a control performed by image manager 1.

FIG. 25 is a flow chart illustrating a control performed by image manager 1.

This flow starts with a connection of digital camera 3 having a function transferring to server computer 8 to image manager 1.

In step S2031, a user logging in to image manager 1 is searched. In step S2032, transmission data is searched. Transmission data has information including a receiving party and a photographer of image data and so. In step S2033, it is judged whether there is image data of a login user after transmission data was searched and when there is, a flow proceeds to step S2034 and when there is not, a flow ends.

In step S2034, image manager 1 tries to connect to server computer 8 based upon information about a receiving party of transmission data. In step S2035, it is detected whether image manager 1 connects to server computer 8 and when image manager 1 connects to server computer 8, a flow proceeds to step S2037 and when not, a flow proceeds to step S2036 and a result of a connection trial is displayed. In step S2037, image data taken by a login user is downloaded from server computer 8. In step S2038, management data of downloaded image data is created and registered into hard disk 102 with image data.

Accordingly, image data of a login user can be easily obtained from image data transferred into a server computer from a digital camera.

Another function of image manager 1 of an embodiment in accordance with this invention will be explained. In addition to fixed hard disk 102, a removable hard disk capable of being removed and changed via connector 105 can be put into image manager 1. A removable hard disk can be used as a bulk memory changeable medium.

Figure 26:
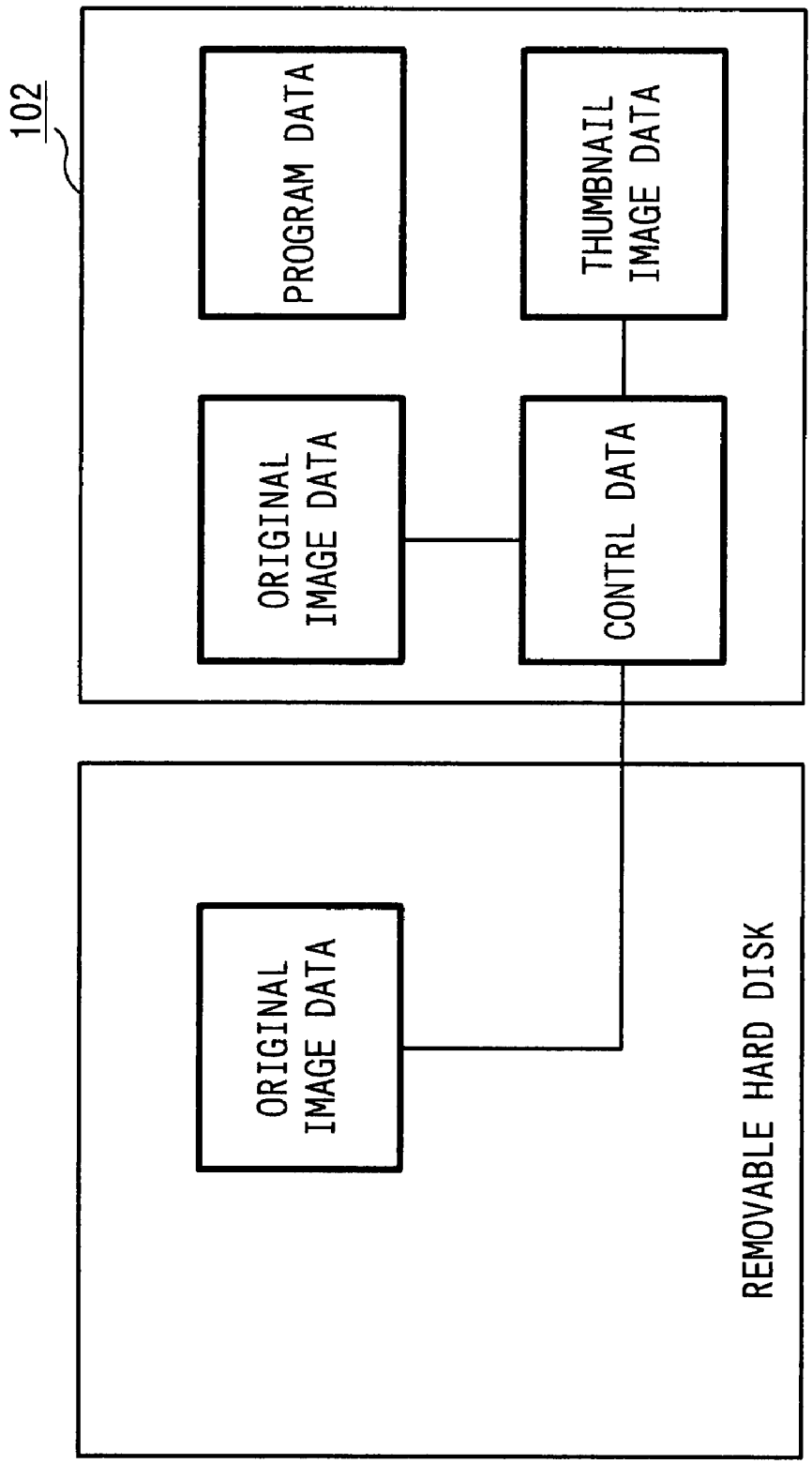
FIG. 26 is a diagram to explain an example of attachment of a removable hard disk and a management way of data in a hard disk.
Figure 27:
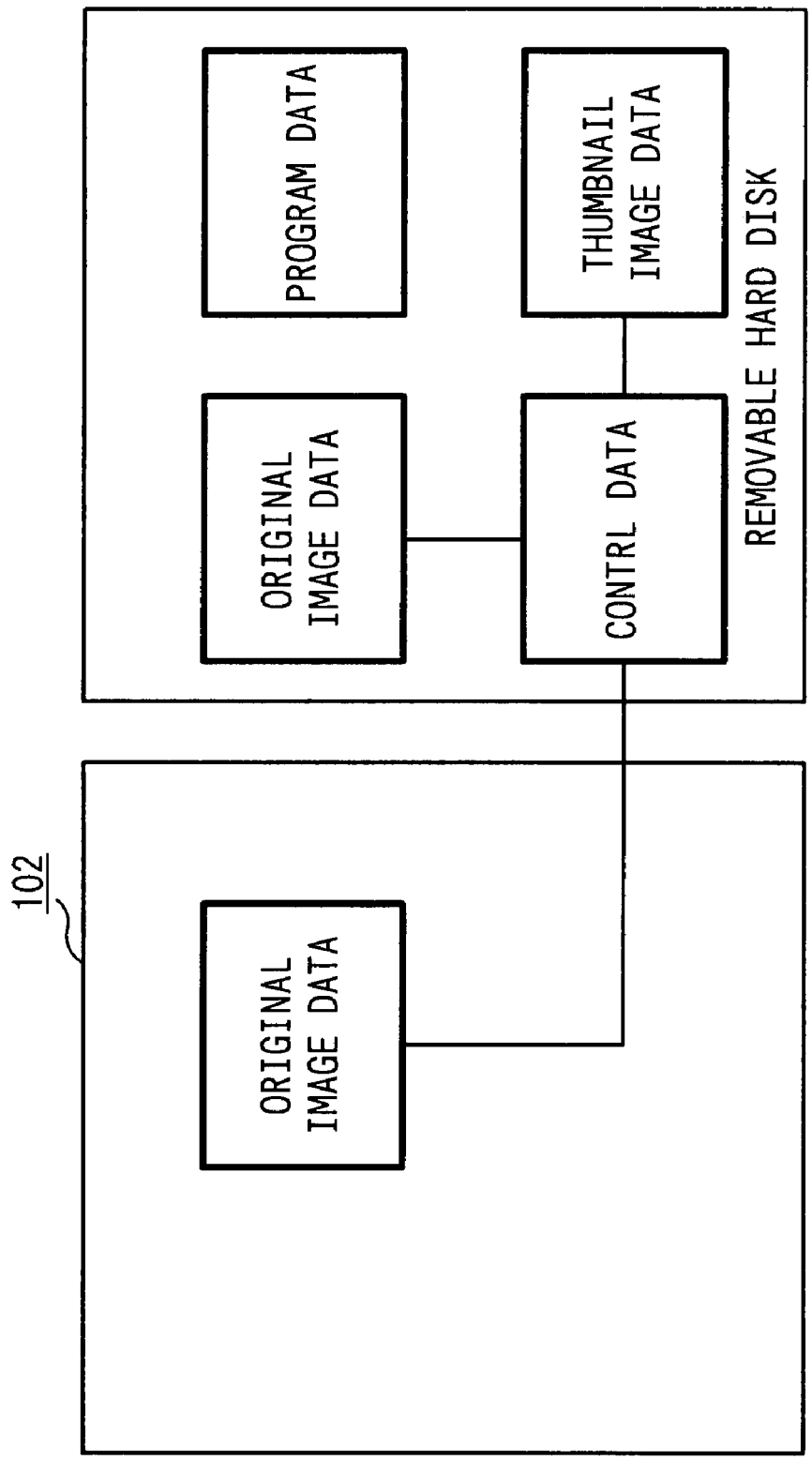
FIG. 27 is a diagram to explain an example of attachment of a removable hard disk and a management way of data in a hard disk.
Figure 28:
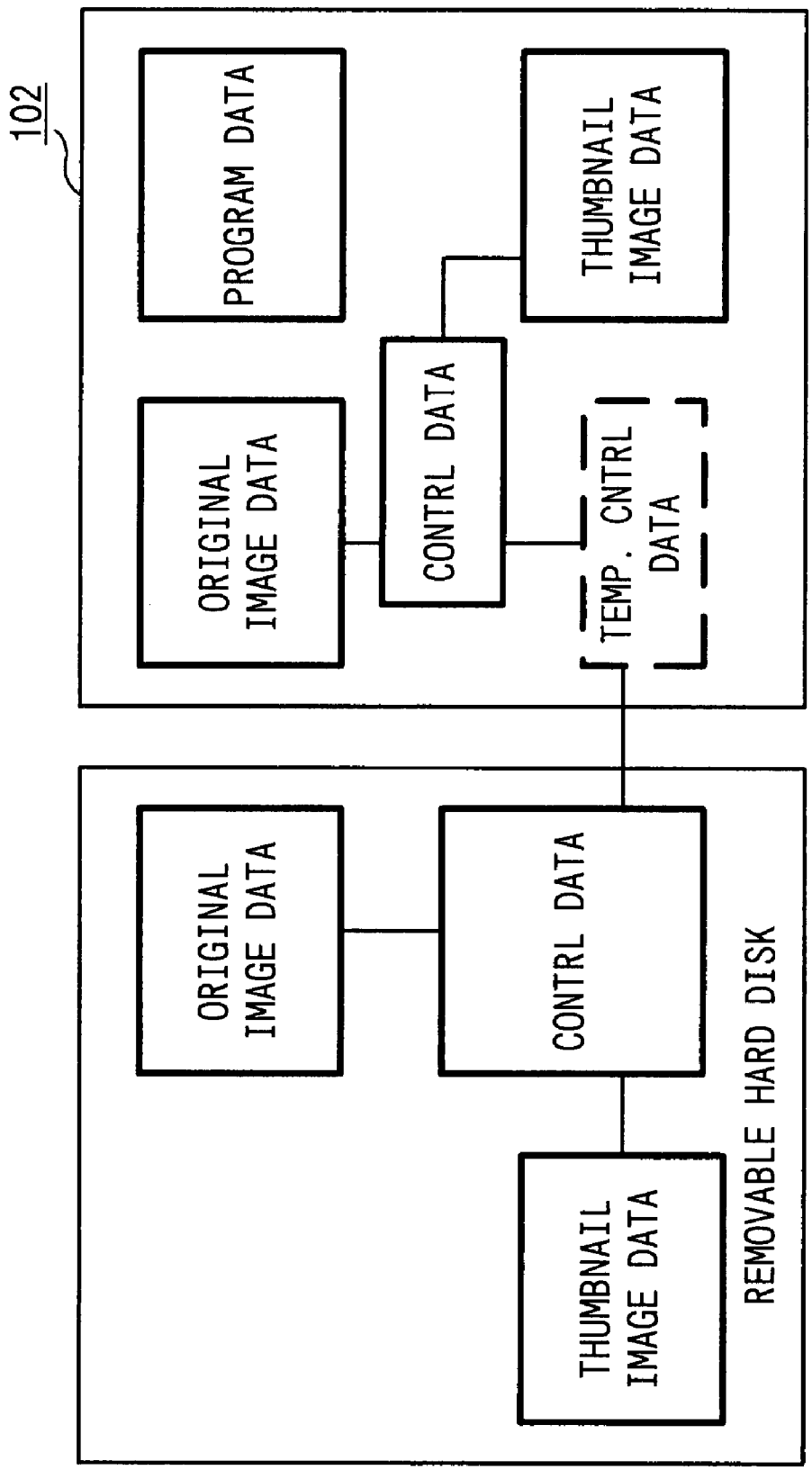
FIG. 28 is a diagram to explain an example of attachment of a hard disk and a management way of data in a hard disk.

Diagrams from FIGS. 26~28 are for explaining an example of attachment of a removable hard disk and a management way of data stored into a hard disk.

According to an embodiment in FIG. 26, management data is centralized to be stored into fixed hard disk 102, not into an attached removable hard disk. This centralized management merit is that a removable hard disk can be controlled in the same way as a medium such as other CD-R and the like. None of management data will get lost because all management data is stored into fixed hard disk 102 in a centralized way.

Some apparatus has a removable hard disk only, not a fixed hard disk. An embodiment in FIG. 27 shows that management data is centralized to be stored into a hard disk where management program is registered. The merit employing this management is that, with centralized storage of management data into the same hard disk having a management program, creating duplication of management data can be avoided since management data surely exists when starting up a management program.

In an embodiment shown in FIG. 28, management data is stored into each hard disk including a fixed hard disk. And once a management program is started up, all management data stored into each of hard disks are searchable. A plurality of management data stored into a plurality of hard disks may be temporarily consolidated onto a specific hard disk as single management data only while image manager 1 is in action.

A specific control carried out by image manager 1 of an embodiment in accordance with this invention will be explained as follow. Firstly, a control on startup to be carried out by image manager 1 will be explained.

Figure 29:
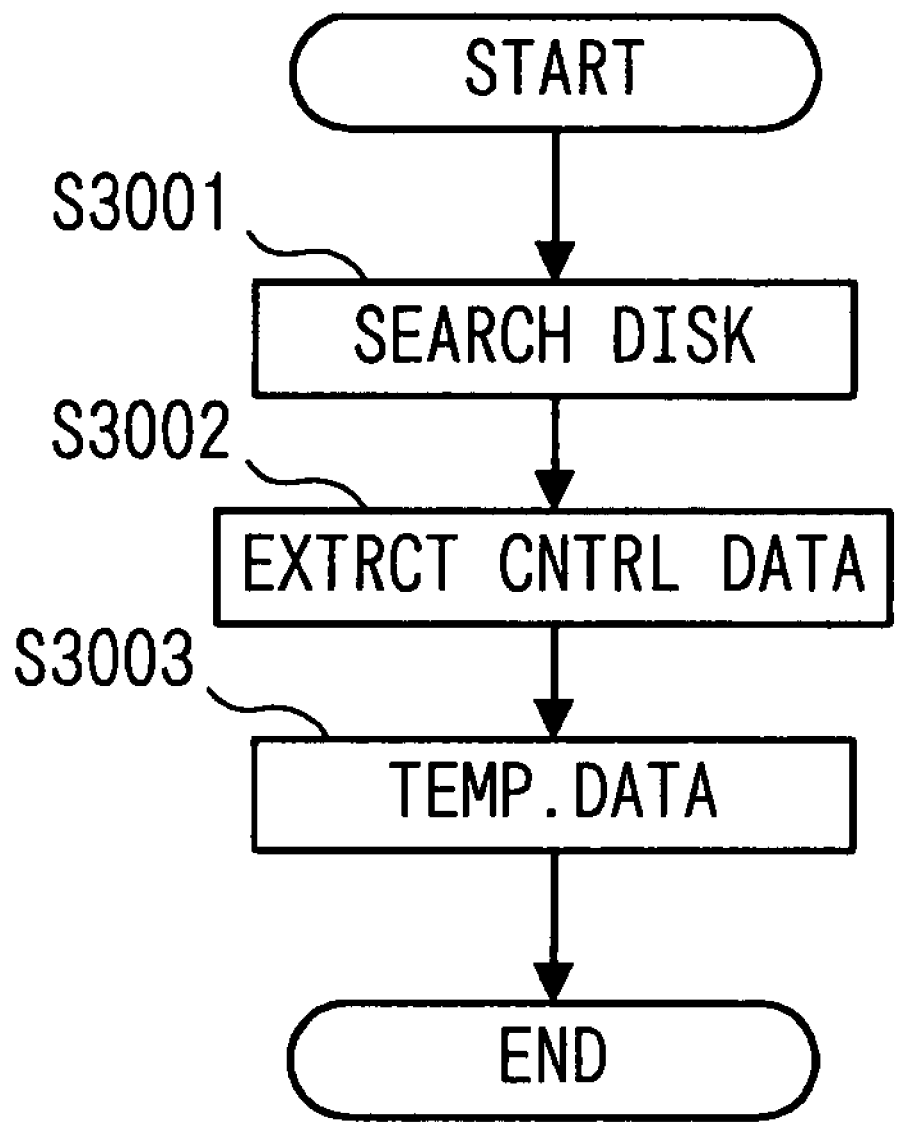
FIG. 29 is a flow chart illustrating a control on startup performed by image manager 1.

FIG. 29 is a flow chart illustrating a control on startup to be performed by image manager 1. This flow starts booting an image management function in image manager 1.

In step S3001, all loaded disks are searched. In step S3002, management data stored into each of hard disks is extracted. In step S3003, management data that compiles extracted management data is created in a hard disk storing a management program. Compiled management data is for temporary use purposes and vanishes when ceasing an image management function. Naturally, when new image data is registered, new image data is registered into compiled management data and management data in individual disk too.

A control on registration to be performed by image manager 1 will be explained.

Figure 30:
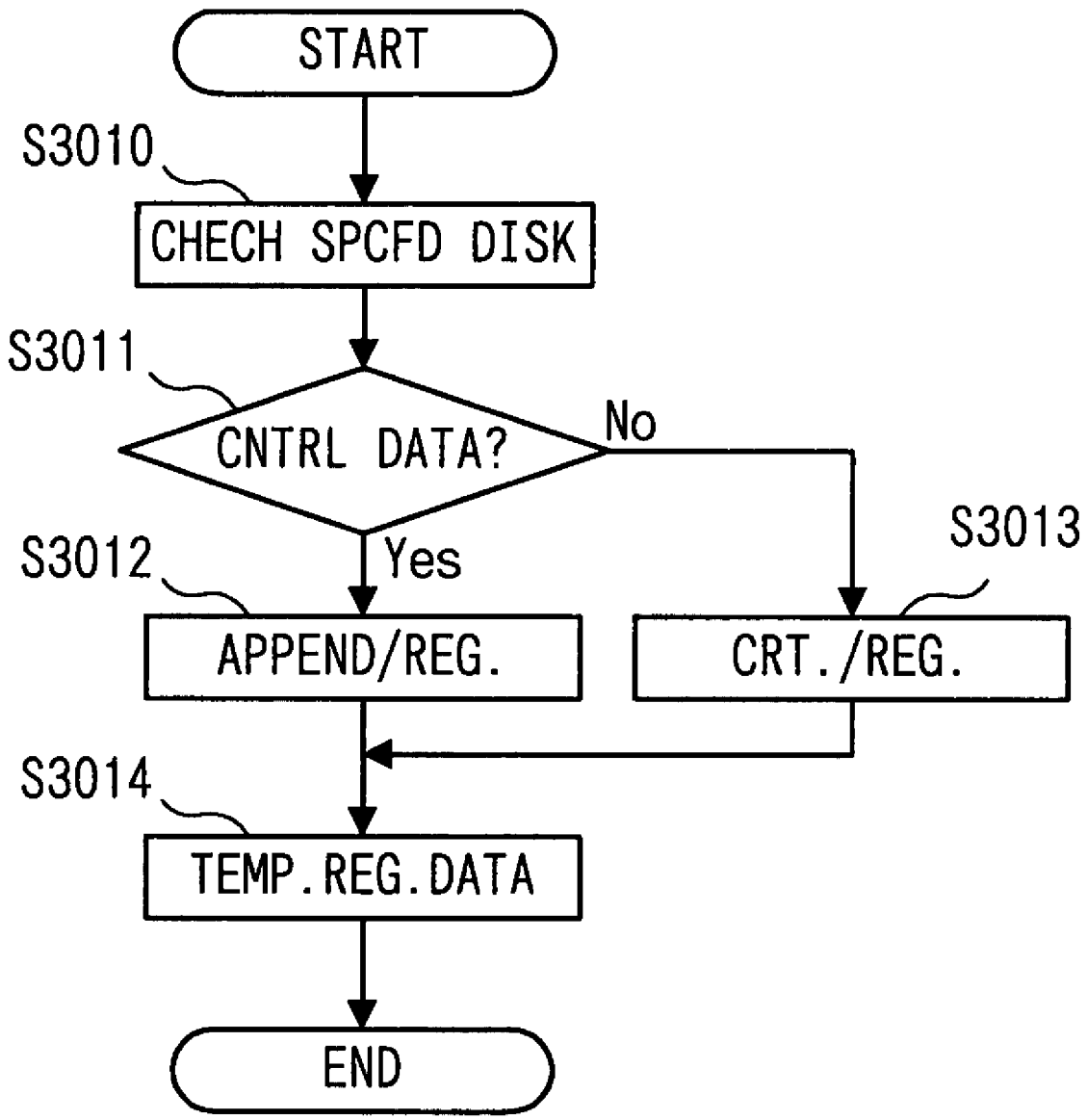
FIG. 30 is a flow chart illustrating a registration control performed by image manager 1.

FIG. 30 is a flow chart illustrating a control on registration to be performed by image management 1.

This flow starts when a user instructs a registration work of image data.

In step S3010, a hard disk specified to store original image data is searched. In step S3011, it is judged whether there is management data and when there is, a flow proceeds to step S3012. When there isn't, a flow proceeds to step S3013.

In step S3012, information of image data to be registered this time is appended into management data and management data is renewed, and image data is stored into a given folder. In step S3013, management data is newly created onto a specific pass and image data is stored into a given folder. A storage location where management data is newly created and stored is a folder of a predetermined pass in such a way that image manager 1 can distinguish. In step S3014, information about image data is also registered into compiled management data.

Accordingly, for example, a removable hard disk being controlled by another image manager becomes controllable only by attaching it into your image manager 1.

As explained in the foregoing, an image manager of an embodiment in accordance with this invention having various functions makes it possible to manage image data without conducting complicated operation works.

What is claimed is:
1. An image manager comprising:
  a bulk memory that stores an Exif image file which was created by a digital camera;
  a register that stores shooting information, which is included in an Exif tag of the Exif image file that was stored in the bulk memory and is attached to the Exif tag at a time of shooting, in a management data region of the bulk memory as management data;
  an obtaining device that obtains information to register into management data for controlling image data of the Exif image file based on the management data stored in the management data region;
  an attachment device that attaches obtained information obtained by the obtaining device to the Exif tag of the Exif image file which was stored in the bulk memory; and
  a detector that detects the obtained information,
  wherein the information obtained by the obtaining device is registered by the register,
  the attachment device attaches the obtained information to the Exif tag of the Exif image file which was stored in the bulk memory when the detector detects that the obtained information is defined in an Exif standard, and
  the bulk memory, the register, the obtaining device, the attachment device and the detector are disposed in one device.

2. The image manager according to claim 1, wherein the attachment device attaches obtained information to image data of the Exif image file when the obtained information obtained by the obtaining device is not attached yet to the image data of the Exif image file stored in the bulk memory.

3. The image manager according to claim 1, wherein the obtaining device is a device for causing a user to manually input information necessary for a registration as the management data of the image data.

4. The image manager according to claim 1, wherein the obtaining device displays a screen to request input of information necessary for a registration when all information necessary for a registration as the management data of the image data is not obtained.

5. The image manager according to claim 1, further comprising a connector that communicably connects to another device, wherein the obtaining device obtains information to be registered.

6. The image manager according to claim 5, wherein the another device is a mobile device.

7. An image manager comprising:
  a bulk memory that stores an Exif image file which was created by a digital camera;
  a checking device that checks whether all information necessary for a registration as management data of image data is attached to an image file stored in the bulk memory, and displays information that is not attached yet when all information is not attached to the image file;
  an obtaining device that obtains information by causing a user to input the information that is not attached yet to the image file;
  a detector that detects whether the information that is not attached yet is input by the user and whether the input information is defined in an Exif standard;
  an attachment device that attaches the information obtained by the obtaining device to an Exif tag of the Exif image file stored in the bulk memory when the detector detects that the obtained information is defined in the Exif standard; and
  a register that (1) stores the information input by the user and the information in the Exif tag in a management data region of the bulk memory as management data when the information that is not attached yet is input by the user, (2) stores the information of the Exif tag in the management data region of the bulk memory as management data, and (3) stores the information in the Exif tag in the management data region of the bulk memory as management data when the information that is not attached yet is not input by the user, wherein the bulk memory, the checking device, the obtaining device, the detector, the attachment device and the register are disposed in one device.

8. The image manager according to claim 7, wherein the attachment device creates a thumbnail image in an Exif format file and attaches an Exif information nearly equal to that of the original image data to the thumbnail image.

* * * * *